United States Patent
Asahi

(12) 
(10) Patent No.: US 6,222,653 B1
(45) Date of Patent: Apr. 24, 2001

(54) OPTICAL COMMUNICATION NODE AND WAVELENGTH DIVISION MULTIPLEXING OPTICAL TRANSMISSION DEVICE HAVING RING STRUCTURE COMPRISING THE OPTICAL COMMUNICATION NODES

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/050,466

(22) Filed: Mar. 31, 1998

(30) Foreign Application Priority Data

Apr. 2, 1997 (JP) .................................................. 9-083697

(51) Int. Cl.[7] .............................. H04B 10/08; H04J 14/02
(52) U.S. Cl. ........................ 359/110; 359/119; 359/124; 359/128
(58) Field of Search .................................. 359/110, 119, 359/124, 128; 370/222, 225, 217

(56) References Cited

U.S. PATENT DOCUMENTS

| | | | |
|---|---|---|---|
| 5,647,035 | * | 7/1997 | Cadeddu et al. ...................... 359/119 |
| 5,933,258 | * | 8/1999 | Flanagan et al. ..................... 359/110 |
| 6,046,832 | * | 4/2000 | Fishman ................................ 359/119 |
| 6,046,833 | * | 4/2000 | Sharma et al. ........................ 359/119 |

FOREIGN PATENT DOCUMENTS 2-234535  9/1990  (JP) .
8-149088  6/1996  (JP) .

* cited by examiner

Primary Examiner—Kinfe-Michael Negash
(74) Attorney, Agent, or Firm—Foley & Lardner

(57) ABSTRACT

A device comprises a plurality of nodes and four optical transmission lines of clockwise and counter-clockwise working operation lines and clockwise and counter-clockwise stand-by lines which connect the nodes in form of a ring. Each node is provided with first and second terminal sections including a receiver and transmitter, with a first optical path switch for switching the optical path between four output terminals of the counter-clockwise working operation and stand-by optical transmission lines, the second terminal section, and output terminal of a first stand-by line, and four input terminals of the clockwise operation and stand-by optical transmission lines, first terminal sections, and a second stand-by line. Each node is also provided with a second optical path switch for switching the optical path between four output terminals of clockwise operation and stand-by optical transmission lines, and first terminal section, and output terminal of the second stand-by path, and four input terminals of the counter-clockwise working operation and stand-by optical transmission lines, second terminal section, and input terminal of the first stand-by path.

86 Claims, 20 Drawing Sheets

λ1~λn-1: SERVICE WAVELENGTH
λn: PROTECTION WAVELENGTH

OPTICAL COMMUNICATION NODE AND WAVELENGTH DIVISION MULTIPLEXING OPTICAL TRANSMISSION DEVICE HAVING RING STRUCTURE COMPRISING THE OPTICAL COMMUNICATION NODES

BACKGROUND OF THE INVENTION

1. Field of the Invention

The present invention relates to an optical transmission device comprising a plurality of nodes connected to each other to form a ring structure. In particular, the present invention relates to an optical transmission device having a ring structure using wavelength division multiplexing technology (WDM).

2. Description of the Related Art

A conventional optical transmission device comprising a plurality of nodes connected to each other to form a ring structure is described as the conventional art with reference to FIG. 16. FIG. 16 is a block diagram for illustrating an exemplary structure of an optical transmission device having a ring structure comprising m nodes, the respective nodes performs optical wavelength division multiplexing of wavelengths 1 to n to transmit optical signals.

In FIG. 16, 901-1 to 901-m represent optical insertion division nodes, 902-1 to 902-4 represent transmission line optical fibers (902-1: counter-clockwise working (or primary) operation system, 902-2: clockwise working operation system, 902-3: counter-clockwise stand-by (or spare) system, and 902-4: clockwise stand-by system, 951 represents an optical pre-amplifier (pre-optical amplifier), 952 represents a wavelength division section, 953 represents wavelength multiplexing section, 954 represents an optical booster amplifier (booster optical amplifier), 955 represents an optical pre-amplifier, 956 represents a wavelength division section, 957 represents a wavelength multiplexing section, 958 represents an optical booster amplifier, 959 represents an optical pre-amplifier, 960 represents a wavelength division section, 961 represents a wavelength multiplexing section, 962 represents an optical booster amplifier, 963 represents an optical amplifier, 964 represents a wavelength division section, 965 represents a wavelength multiplexing section, 966 represents an optical booster amplifier, 967-1 to 967-n represent insertion division (ADM) devices, 971 to 974 represent high speed signal reception interface sections, 975 to 978 represent high speed signal transmission interface sections, 979 represents a cross connector section, and 980 represents a low speed signal interface section.

In FIG. 16, m nodes are connected to form a ring with a total of four transmission line optical fibers, where two of the lines comprise a bi-directional working (or primary) operation system, and where the other two of the lines comprise a bi-directional stand-by (or backup) operation system. Each node transmits a wavelength division multiplexed (WDM) optical signal having n wavelengths of $\lambda 1$ to $\lambda n$ to the above-mentioned four optical fiber transmission lines respectively, and each node receives the wavelength division multiplexed optical signal having n wavelengths of $\lambda 1$ to $\lambda n$ from the above-mentioned four optical fiber transmission lines.

Next, an operation performed in each node of the conventional optical transmission device having a ring structure as described above is described herein under.

The optical signal received from the counter-clockwise operation system is amplified by the optical pre-amplifier 951, and divided into n wavelength components having wavelengths of $\lambda 1$ to $\lambda n$ in the wavelength division section 952. The wavelength-divided n optical signals having wavelengths of $\lambda 1$ to $\lambda n$ are inputted to ADM devices 967-1 to 967-n respectively. In detail, the optical signal having a wavelength of $\lambda 1$ is inputted to the ADM device 967-1, the optical signal having a wavelength of $\lambda 2$ is inputted to the ADM device 967-2, and the optical signal having a wavelength $\lambda n$ is inputted to the ADM device 967-n.

n optical signals having wavelengths of $\lambda 1$ to $\lambda n$ are outputted from the respective ADM devices 967-1 to 967-n. In detail, the optical signal having a wavelength of $\lambda 1$ is outputted from the ADM device 967-1, the optical signal having a wavelength of $\lambda 2$ is outputted from the ADM device 967-2, and the optical signal having a wavelength $\lambda n$ is outputted from the ADM device 967-n. n optical signals having wavelengths of $\lambda 1$ to $\lambda n$ are subjected to wavelength division multiplexing operation in the wavelength multiplexing section 953 to form a single optical signal. The single optical signal is amplified by the optical booster amplifier 954, and then sent out to the counter-clockwise operation optical fiber transmission line. The optical signal that is transmitted/received through other transmission lines, namely, the clockwise working operation system 902-2, counter-clockwise stand-by system 902-3, and clockwise stand-by system 902-4, is subjected to a multiplexing division (or separation) operation involving wavelengths of $\lambda 1$ to $\lambda n$ like the above-mentioned operation.

In FIG. 16, the optical pre-amplifier 955, wavelength division section 956, wavelength multiplexing section 957, and optical booster amplifier 958 are applied to the clockwise working operation system, the optical pre-amplifier 959, wavelength division section 960, wavelength multiplexing section 961, and optical booster amplifier 962 are applied to the counter-clockwise stand-by system, and the optical pre-amplifier 963, wavelength division section 964, wavelength multiplexing section 965, and optical booster amplifier 966 are applied to the clockwise stand-by system.

Operation in the ADM device 967-1 is described herein under.

Four optical signals having wavelength of $\lambda 1$ inputted from the wavelength division sections 952, 956, 960, and 964 are respectively subjected to optical/electric conversion, overhead signal termination, and time-division separation in high speed signal reception interface sections (HSRx) 971 to 974. Afterwards, the optical signals are inputted to the cross connector section 979 as electric data signals. Electric signals are inputted from the cross connector section 979 to the high speed signal transmission interface sections (HSTx) 975 to 978, where the electric signals are subjected to time-division multiplexing, overhead signal insertion, and electric/optical conversion operation, and then optical signals having wavelength of $\lambda 1$ are outputted to the wavelength multiplexing section 953, 957, 961, and 965. The cross connector section 979 functions to connect four pairs of electric data signals inputted from the high speed reception interface sections (HSRx) 971 to 974 selectively to four pairs of electric signals to be outputted to the high speed signal transmission interface sections 975 to 978 depending on the failure condition of transmission lines in the ring network, and functions to division-connect partially or entirely the input electric data signal to the low speed signal interface section 980 and to insert the signal from the low speed signal interface section 980 in an output data signal.

Next, recovery operation performed when the transmission line of the conventional ring optical transmission device shown in FIG. 16 experiences a failure is described. FIG. 17 is a set of diagrams for illustrating the recovery operation.

In FIG. 17(a) during working (or normal) operation, data signals are communicated through the two operation transmission lines between the node 2 and node 5. In node 2 and node 5, the data signal is inputted from/outputted to the low speed signal interface section in each node, and the cross connector section sets the path.

Recovery operation performed when two operation transmission lines experiences a failure between the node 2 and node 3 is shown in FIG. 17(b). In this case, in the node 2, the cross connector section changes connection from the path that a data signal is allowed to be communicated through the operation transmission line side between the node 3 and node 2 for insertion division, to the path that a data signal is allowed to be communicated to the stand-by transmission line side between the node 3 and node 2 for insertion division. On the other hand, in the node 3, the cross connector section performs path change so that an optical signal inputted/outputted through the node 2 side stand-by transmission line is connected to an optical signal inputted/outputted through the node 4 side working operation transmission line. Thereby, the communication of data signals is secured by by-passing the failed transmission line.

Recovery operation performed when both working operation and stand-by transmission lines experiences a failure between the node 2 and node 3 is shown in FIG. 17(c). In this case, in the node 2, the cross connector section changes connection from the path that a data signal is allowed to be communicated through the operation transmission line side between the node 2 and node 3 for insertion division, to the path that a data signal is allowed to be communicated through the stand-by transmission side between the node 2 and node 1 for insertion division. On the other hand, in the node 3, the cross connector section performs path change so that an optical signal inputted/outputted through the node 4 side stand-by transmission line is connected to an optical signal inputted/outputted through the node 4 side operation transmission line. Thereby, the communication of data signals is secured by by-passing the failed transmission line.

Recovery operation performed when the node 3 experiences a failure is shown in FIG. 17(d). In this case, in the node 2, the cross connector section changes connection from the path that a data signal is allowed to be communicated through the operation transmission line side between the node 2 and node 3 for insertion division, to the path that a data signal is allowed to be communicated through the stand-by transmission side between the node 2 and node 1 for insertion division. On the other hand, in the node 4, the cross connector section performs path change so that an optical signal inputted/outputted through the node 5 side stand-by transmission line is connected to an optical signal inputted/outputted through the node 5 side operation transmission line. Thereby, the communication of data signals is secured by by-passing the node that has failed.

Next, another conventional ring optical transmission device is described. FIG. 18 shows an exemplary structure of a ring optical transmission device comprising m nodes, and each node performs optical division multiplexing of wavelengths of $\lambda 1$ to $\lambda n$ and transmits signals.

In FIG. 18, 901-1 to 901-m represent optical insertion division nodes, 902-1 to 902-4 represent transmission line optical fibers (902-1: counter-clockwise working operation system, 902-2: clockwise working operation system, 902-3: clockwise stand-by system, and 902-4: counter-clockwise stand-by system), 1001 represents an optical pre-amplifier, 1002 represents a wavelength division section, 1003 represents a wavelength multiplexing section, 1004 represents an optical booster amplifier, 1005 represents an optical pre-amplifier, 1006 represents a wavelength division section, 1007 represents a wavelength multiplexing section, 1008 represents an optical booster amplifier, 1009-1 to 1009-n represent insertion division devices (ADM), 1010 and 1011 represent optical junction amplifiers, 1012 to 1015 represent 2×2 optical switches, 1051 and 1054 represent high speed signal reception interface sections, 1052 and 1053 represent high speed signal transmission interface sections, and 1055 and 1056 represent cross connector sections.

In FIG. 18, m nodes are connected to form a ring with a total four transmission line optical fibers, where two of the lines comprises a first two-way operation system, and where the other two of the lines comprise a second two-way operation system. Each node sends out an optical signal with n wavelengths of $\lambda 1$ to $\lambda n$ that are subjected to wavelength division multiplexing to the above-mentioned optical fiber transmission line, and each node receives the optical signal with n wavelengths of $\lambda 1$ to $\lambda n$ that are subjected to wavelength division multiplexing from the above-mentioned optical fiber transmission line.

Operation performed during a working (or normal) condition, namely, while there is no failure in the network, is described herein under.

The optical signal received from the counter-clockwise operation transmission line optical fiber is amplified by the optical pre-amplifier 1001 through the 2×2 optical switch 1012, and divided into n wavelength components having wavelengths of $\lambda 1$ to $\lambda n$ by the wavelength division section. The wavelength divided n optical signals having wavelengths of $\lambda 1$ to $\lambda n$ are inputted to the ADM devices 1009-1 to 1009-n. In detail, the optical signal having a wavelength of $\lambda 1$ is inputted to the ADM device 1009-1, the optical signal having a wavelength of $\lambda 2$ is inputted to the ADM device 1009-2, and the optical signal having a wavelength of $\lambda n$ is inputted to the ADM device 1009-n.

n optical signals having wavelengths of $\lambda 1$ to $\lambda n$ are outputted from the respective ADM devices 1009-1 to 1009-n. In detail, the optical signal having the wavelength of $\lambda 1$ is outputted from the ADM device 1009-1, the optical signal having the wavelength of $\lambda 2$ is outputted from the ADM device 1009-2, and the optical signal having the wavelength of $\lambda n$ is outputted from the ADM device 1009-n. n optical signals having wavelengths of $\lambda 1$ to $\lambda n$ outputted from the respective ADM devices 1009-1 to 1009-n are subjected to wavelength division multiplexing in the wavelength multiplexing section 1003 for forming a signal optical signal and the single optical signal is amplified by the optical booster amplifier 1004, and sent out to the counter-clockwise operation optical fiber transmission line through the 2×2 optical switch 1013. The optical signal transmitted/received through the clockwise operation system 902-2 is subjected to multiplexing division operation in the same way as described herein above.

In FIG. 18, the 2×2 optical switch 1015, optical pre-amplifier 1005, wavelength division section 1006, wavelength multiplexing section 1007, optical booster amplifier 1008, and 2×2 optical switch 1014 are applied to the clockwise operation system.

Next, recovery operation performed when the transmission line of the conventional ring optical transmission device shown in FIG. 18 experiences a failure is described herein under. FIG. 19 is a set of diagrams for illustrating the recovery operation.

In FIG. 19(a) during working operation, data signals are communicated between the node 2 and the node 5 through a first two-way working operation transmission system that includes two lines. The node 2 and node 5 output/input data signals through the low speed signal interface section in the respective nodes, and cross connector sections set the path.

Recovery operation performed when two working operation transmission lines experiences a failure between the node 2 and node 3 is shown in FIG. 19(b). In this case, in the node 2, the 2×2 optical switch changes connection from the path that the optical signal is allowed to be communicated through the working operation transmission line side between the node 2 and node 3, to the path that the optical signal is allowed to be communicated through the opposite stand-by transmission side between the node 3 and node 4. Thereby, data signal communication is secured by by-passing the failed transmission line.

Recovery operation performed when both operation and stand-by transmission lines experiences a failure between the node 2 and node 3 is shown in FIG. 19(c). In this case, the data signal communication is secured by by-passing the failed transmission line by way of applying the same operation as described in FIG. 19(b).

Recovery operation performed when the node 3 experiences a failure is shown in FIG. 19(d). In this case, in the node 2, the 2×2 optical switch changes connections from the path that the optical signal is allowed to be communicated through the working operation transmission line side between the node 2 and node 3, to the path that the optical signal is allowed to be communicated through the opposite stand-by transmission side between the node 4 and node 5. Thereby, the data signal communication is secured by by-passing the failed transmission line.

The conventional optical transmission device having a ring structure involves problems as described hereinafter.

First, a conventional optical transmission device having a ring structure according to the first conventional art requires four high speed transmission/reception interface sections per one insertion division device (ADM) for performing data signal processing of one wavelength in each node, and a cross connector circuit for performing path change of all the signals connected to these high speed transmission/reception interfaces. Therefore, an optical transmission device having a ring structure involving n wavelengths should have n times devices, and such an optical transmission device is very expensive and large-sized, thereby causing a problem.

Next, a conventional optical transmission device having a ring structure according to the second conventional art can set the optical signal outputted from each node to only two paths of the working operation transmission line and opposite stand-by transmission line, and can not change the path to the stand-by transmission line in the same direction. As shown in FIG. 19, when the operation transmission line between the node 2 and node 3 fails and the node 6 fails simultaneously, the node 2 can not communicate with the node 5 in the case of the second conventional art. Therefore, an optical transmission device having a ring structure of this type is disadvantageous in that the reliability in failure measure is low, and thereby causing a problem.

SUMMARY OF THE INVENTION

The present invention relates to an optical communication node and a wavelength division multiplexing optical transmission device having a ring structure comprising such optical communication nodes, and provides a reliable system having a simple structure.

To solve the above-mentioned problems of the conventional structure, the optical communication node and the wavelength division multiplexing optical transmission device having a ring structure comprising such optical communication nodes having the first structure that each node is provided with the first terminal section and second terminal section respectively including the first receiver and second receiver for converting respectively the first reception optical signal and second reception optical signal inputted from the input terminal to the electric signal and the first transmitter and second transmitter for respectively converting the electric signal to the optical signal and outputting the first transmission optical signal and second transmission optical signal from the output terminal, and the first stand-by path and second stand-by path having respectively an input terminal and output terminal.

Each node is provided with the first optical path switching means for switching the path of the optical signal inputted from the first input port and for outputting to the first output port, which first input port is connected to the counter-clockwise working operation optical transmission line, the counter-clockwise stand-by optical transmission line, the output terminal of the second terminal section, and the output terminal of the first stand-by path respectively, and which first output port is connected to the clockwise working operation optical transmission line, the clockwise stand-by optical transmission line, the input terminal of the first terminal section, and the input terminal of the second stand-by path respectively, and the second optical path switching means for switching the path of the optical signal inputted from the second input port and for outputting to the second output port, which second input port is connected to the clockwise working operation optical transmission line, the clockwise stand-by optical transmission line, the output terminal of the first terminal section, and the output terminal of the second stand-by path, and which second output port is connected to the counter-clockwise working operation optical transmission line, the counter-clockwise stand-by optical transmission line, the input terminal of the second terminal section, and the input terminal of the first stand-by path, respectively.

The first stand-by path is provided with the first junction optical amplifier provided between the input terminal and output terminal, for amplifying the input optical signal and for outputting the first junction amplification optical signal. The second stand-by path is provided with the second junction optical amplifier provided between the input terminal and output terminal, for amplifying the input optical signal and for outputting the second junction amplification optical signal.

In addition to the above-mentioned structure, each node is further provided with the first optical pre-amplifier provided between the first optical path switching switch and the first receiver for optically amplifying the first reception optical signal and outputting it to the first receiver, and the second optical pre-amplifier provided between the second optical switching switch and the second receiver for optically amplifying the second reception optical signal and outputting it to the second receiver.

Each node is further provided with a first booster optical amplifier provided between the first optical path switching switch and the second transmitter for optically amplifying the first transmission optical signal and outputting it to the second optical path switching switch. Each node is also provided with a second booster optical amplifier provided between the second optical path switching switch and the first transmitter for optically amplifying the first transmission optical signal and outputting it to the first optical path switching switch.

The first terminal section and the second terminal section are respectively provided with a first reception interface section and second reception interface section for respectively performing overhead termination and division operation on the first reception optical signal and the second reception optical signal, and a first transmission interface section and second transmission interface section for performing time-division multiplexing on the input electric signal to perform overhead signal insertion, and subsequently for generating and outputting an optical signal having the same wavelength as the optical signal inputted to the reception interface. The first terminal section and the second terminal section are respectively provided with a low speed signal interface section for at least partially transmitting/receiving the data signal inputted/outputted through the first transmission interface section and the first reception interface, and the second transmission interface section and the second reception interface, and a cross connector section for connecting selectively two pairs of electric data signals inputted from the first reception interface section and the second reception interface section and two pairs of electric data signals outputted to the first transmission interface section and second transmission interface section depending on failure condition of optical transmission lines and nodes of the wavelength division multiplexing optical transmission device having a ring structure, and for at least partially separating or inserting the data signal inputted/outputted through the first transmission interface section and the first reception interface, and the second transmission interface section and the second reception interface, and inputting to the low speed interface section.

In each optical communication node of the present invention, the first wavelength division section and the second wavelength division section respectively have an arrayed-waveguide grating, and the first wavelength multiplexing section and the second wavelength multiplexing section respectively have an arrayed-waveguide grating.

The first junction optical amplifier and the second junction amplifier are respectively provided with an optical fiber amplifier or a semiconductor optical amplifier. The first optical pre-amplifier and the second optical pre-amplifier are provided with an optical fiber amplifier or a semiconductor optical amplifier. The first booster optical amplifier and the second booster optical amplifier are respectively provided with an optical fiber amplifier or a semiconductor optical amplifier.

The wavelength division multiplexing optical transmission device the present invention having a ring structure is provided with m above-mentioned nodes, adjacent nodes are connected each other with four transmission lines comprising the clockwise operation optical transmission line, counter-clockwise operation optical transmission line, clockwise stand-by optical transmission line, and counter-clockwise optical transmission line to form a ring structure.

Because the relation between the optical communication node and the wavelength division multiplexing optical transmission device having a ring structure comprising the optical communication node in the basic structures from the second basic structure to the eighth basic structure of the present invention is the same as that in the first basic structure, the basic structures from the second basic structure to the eighth basic structure are described as a wavelength division multiplexing optical transmission device having a ring structure.

As a second basic structure, the wavelength division multiplexing optical transmission device having a ring structure of the present invention is a wavelength division multiplexing optical transmission device having a ring structure comprising m nodes, in which adjacent nodes are connected to each other with an optical transmission line to form a ring structure. The optical transmission line comprises a clockwise operation optical transmission line, counter-clockwise operation optical transmission line, clockwise stand-by optical transmission line, and counter-clockwise stand-by optical transmission line. Each node is provided with a first wavelength division section for performing wavelength division operation on a first input optical signal which is a wavelength multiplexed optical signal including respective wavelength components of $\lambda 1$ to $\lambda n$ wavelength (n is an integer of 2 or larger hereinafter) inputted from an input terminal into the respective wavelength components, and outputting n first wavelength divided lights comprising the respective wavelength components, a first wavelength multiplexing section for wavelength-multiplexing the respective optical signals having the respective wavelength components of $\lambda 1$ to $\lambda n$ wavelength inputted from the input terminal, and outputting the second multiplexed optical signal, a second wavelength division section for performing wavelength division operation on a second input optical signal which is a wavelength multiplexed optical signal including respective wavelength components of $\lambda 1$ to $\lambda n$ wavelength inputted from the input terminal into the respective wavelength components, and outputting n second wavelength divided lights comprising the respective wavelength components, a second wavelength multiplexing section for wavelength-multiplexing the respective optical signals having the respective wavelength components of $\lambda 1$ to $\lambda n$ wavelength inputted from the input terminal, and outputting the second multiplexed optical signal. Further, each node is provided with n insertion division sections, each of the insertion division sections includes a first wavelength divided light input section and a second wavelength divided light input section for respectively receiving the first wavelength divided light and the corresponding second wavelength divided light having the wavelength component of the same wavelength $\lambda 1$ ($1 \leq i \leq n$) out of n first wavelength divided lights and n second wavelength divided light, and a first insertion optical signal input section and a second insertion optical signal input section for respectively receiving the first insertion optical signal and second insertion optical signal having the same wavelength as the wavelength $\lambda 1$ ($1 \leq i \leq n$), and for respectively outputting the first insertion optical signal and the second insertion optical signal to the first wavelength multiplexing section and the second wavelength multiplexing section. Further, each node is provided with the first stand-by path and the second stand-by path having respectively an input terminal and output terminal, a first optical path switching switch for switching the path of the optical signal inputted from the first input port and for outputting to the first output port, the first input port is connected to the counter-clock operation optical transmission line output terminal, the counter-clockwise stand-by optical transmission line output terminal, the output terminal of the second terminal section, and the output terminal of the first stand-by path, respectively, and the first output port is connected to the clockwise working operation optical transmission line input terminal, the clockwise stand-by optical transmission line input terminal, the input terminal of the first terminal section, and the input terminal of the second stand-by path, respectively, and a second optical path switching switch for switching the path of the optical, signal inputted from the input port of the second input port and for outputting to the output port of the second output port, the second input port is connected to the clockwise working operation optical transmission line output terminal, the clockwise stand-by optical transmission line output terminal, the output terminal of the first terminal section, and the output terminal of the second stand-by path.

The first stand-by path is provided with a first junction optical amplifier provided between the input terminal and output terminal, for amplifying the input optical signal having n wavelength components of $\lambda 1$ to $\lambda n$ wavelength and outputting a first junction amplified optical signal, and a second stand-by path is provided with a second junction optical amplifier provided between the input terminal and output terminal, for amplifying the input optical signal having n wavelength components of $\lambda 1$ to $\lambda n$ wavelength and outputting a second junction amplified optical signal.

Each node is further provided with a first optical pre-amplifier provided between the first optical path switching switch and the first wavelength division section for optically amplifying the input multiplexing optical signal and outputting to the first wavelength division section, and a second optical pre-amplifier provided between the second optical path switching switch and the second wavelength division section for optically amplifying the input multiplexing optical signal and outputting to the second wavelength division section. Further, each node is provided with a first booster optical amplifier provided between the first optical path switching switch and the second wavelength multiplexing section for optically amplifying the second multiplexing optical signal and outputting to the first optical path switching switch, and a second booster optical amplifier provided between the second optical path switching switch and the first wavelength multiplexing section for optically amplifying the first multiplexing optical signal and outputting to the second optical path switching switch.

Each of n insertion division sections is provided with an photoelectric converter for respectively converting the first wavelength divided light and the second wavelength divided light to an electric signal, a first reception interface section and second reception interface section for performing overhead termination and division operation on the first wavelength divided light and the second wavelength divided light, and a first transmission interface section and second transmission interface section for performing time-division multiplexing on the electric data signal to perform overhead signal insertion, and subsequently for generating and outputting an optical signal having the same wavelength $\lambda i$ as the optical signal inputted to the reception interface.

Each of n insertion division sections is provided with a low speed signal interface section for at least partially transmitting/receiving the data signal inputted/outputted through the first transmission interface section and the first reception interface, and a second transmission interface section and a second reception interface, and a cross connector section for connecting selectively two pairs of electric data signals inputted from the first reception interface section and the second reception interface section and two pairs of electric data signals outputted to the first transmission interface section and second transmission interface section depending on failure condition of optical transmission lines or nodes of the wavelength division multiplexing optical transmission device having a ring structure, and for at least partially separating or inserting the data signal inputted/ outputted through the first transmission interface section and the first reception interface, and the second transmission interface section and the second reception interface, and inputting to the low speed interface section.

As a third basic structure, each node is further provided with a first n×n optical switch provided subsequently to the first wavelength division section for connecting selectively respective optical signals having wavelengths of $\lambda 1$ to $\lambda n$ inputted from the first wavelength division section to n insertion division sections, and a second n×n optical switch provided subsequently to the second wavelength division section for connecting selectively respective optical signals having wavelengths of $\lambda 1$ to $\lambda n$ inputted from the second wavelength division section to n insertion division sections.

Further, as a fourth basic structure of the present invention, instead of the above-mentioned structure, each node is provided with p (p is an integer of n or lager hereinafter) insertion division sections including n insertion division sections, a first n×p optical switch provided subsequently to the first wavelength division section for connecting selectively n optical signals having wavelengths of $\lambda 1$ to $\lambda n$ inputted from the wavelength division section to the p insertion division sections, a second n×p optical switch provided subsequently to the first wavelength division section for connecting selectively n optical signals having wavelengths of $\lambda 1$ to $\lambda n$ inputted from the wavelength division section to the p insertion division sections, the first p×n optical switch provided preceding to the first wavelength multiplexing section for connecting selectively p optical signals inputted from each insertion division section to each input terminal of the first wavelength multiplexing section, and the second p×n optical switch provided preceding to the second wavelength multiplexing section for connecting selectively p optical signals inputted from each insertion division section to each input terminal of the second wavelength multiplexing section. On the other hand, each insertion division section is further provided with a wavelength selection section for selecting an optical signal wavelength out of the wavelengths of $\lambda 1$ to $\lambda n$.

Each node is further provided with a reception side 2×2 optical switch for switching selectively each other the first wavelength divided light out of n first first wavelength divided lights and first second wavelength divided light out of n second wavelength divided lights and outputting to the first wavelength divided light input section of the first insertion division section out of n insertion division sections and the second insertion division section, and a transmission side 2×2 optical switch for switching selectively each other the first insertion optical signal out of n first first insertion optical signals and first second insertion optical signal out of n second insertion optical signals and outputting to the first wavelength multiplexing section and the second wavelength multiplexing section.

As a fifth basic structure, the wavelength division multiplexing optical transmission device having a ring structure of the present invention is the wavelength division multiplexing optical transmission device having a ring structure comprising m nodes, in which adjacent nodes are connected each other with the optical transmission line to form a ring structure, in which the optical transmission line comprises a clockwise working operation optical transmission line, a counter-clockwise working operation optical transmission line, a clockwise stand-by optical transmission line, and a counter-clockwise stand-by optical transmission line. Each node is provided with a first wavelength division section for performing wavelength division operation on a first input optical signal which is the wavelength multiplexed optical signal including respective wavelength components of $\lambda 1$ to $\lambda n$ wavelength inputted from the input terminal into the respective wavelength components, and outputting n first wavelength divided lights comprising the respective wavelength components, a first wavelength multiplexing section for wavelength-multiplexing the respective optical signals having the respective wavelength components of $\lambda 1$ to $\lambda n$ wavelength inputted from the input terminal, and outputting the second multiplexed optical signal, a second wavelength division section for performing wavelength division operation on a second input optical signal which is a wavelength multiplexed optical signal including respective wavelength components of $\lambda 1$ to $\lambda n$ wavelength inputted from the input terminal into the respective wavelength components, and outputting n second wavelength divided lights comprising the respective wavelength components, a second wavelength multiplexing section for wavelength-multiplexing the respective optical signals having the respective wavelength components of $\lambda 1$ to $\lambda n$ wavelength inputted from the input terminal, and outputting a second multiplexed optical signal, and at least one insertion division section including a first reception means for converting an input optical signal to an electric signal, a second reception means for converting an input optical signal to an electric signal, first transmission means for converting an electric signal to an optical signal to output, and second transmission means for converting an electric signal to an optical signal to output. Each node is provided with a reception side 2×2 optical switch for switching selectively each other at least one first wavelength divided light out of n first wavelength divided lights and the second wavelength divided light having the wavelength component of wavelength $\lambda i$ corresponding to the wavelength $\lambda i$ of the first wavelength divided light, and outputting to the first reception means and the second reception means of the insertion division section corresponding to the wavelength $\lambda i$ out of the insertion division sections. The first stand-by path and second stand-by paths have respectively an input terminal and output terminal, a first optical path switching switch for switching the path of the optical signal inputted from the first input port and for outputting to the first output port, in which the first input port is connected to the counter-clock working operation optical transmission line output terminal, the counter-clockwise stand-by optical transmission line output terminal, the output terminal of the second wavelength multiplexing section, and the output terminal of the first stand-by path, respectively, in which the first output port is connected to the clockwise working operation optical transmission line input terminal, the clockwise stand-by optical transmission line input terminal, the input terminal of the first wavelength division section, and the input terminal of the second stand-by path, respectively, and the second optical path switching switch for switching the path of the optical signal inputted from the second input port and for outputting to the second output port, in which second input port is connected to the clockwise working operation optical transmission line output terminal, the clockwise stand-by optical transmission line output terminal, the output terminal of the first wavelength multiplexing section, and the output terminal of the second stand-by path, respectively, in which the second input port is connected to counter-clockwise working operation optical transmission line output terminal, counter-clockwise stand-by optical transmission line, the output terminal of wavelength division section, and the output terminal of the first stand-by path, respectively.

Each node is further provided with a transmission side 2×2 optical switch for switching selectively each other the i-th first insertion optical signal out of the n first insertion optical signals and the i-th second insertion optical signal out of n second insertion optical signals and outputting to the first wavelength multiplexing section and the second wavelength multiplexing section.

The first stand-by path and the second stand-by path are provided with a first junction optical amplifier and a second junction optical amplifier provided between the input terminal and output terminal, for amplifying the input optical signal having n wavelength components of $\lambda 1$ to $\lambda n$ wavelength and outputting a first junction amplified optical signal and a second junction amplified optical signal.

Each node is provided with a first optical pre-amplifier provided between the first optical path switching switch and the first wavelength division section for optically amplifying the input multiplexing optical signal and outputting to the first wavelength division section, and a second optical pre-amplifier provided between the second optical path switching switch and the second wavelength division section for optically amplifying the input multiplexing optical signal and outputting to the second wavelength division section.

Each node is further provided with a first booster optical amplifier provided between the first optical path switching switch and the second wavelength multiplexing section for optically amplifying the second multiplexing optical signal and outputting to the first optical path switching switch, and a second booster optical amplifier provided between the second optical path switching switch and the first wavelength multiplexing section for optically amplifying the first multiplexing optical signal and outputting to the second optical path switching switch.

As a fifth basic structure, a wavelength division multiplexing optical transmission device having a ring structure of the present invention is a wavelength division multiplexing optical transmission device having a ring structure comprising m nodes, in which adjacent nodes are connected to each other with an optical transmission line to form a ring structure. The optical transmission line comprises a clockwise optical transmission line and counter-clockwise optical transmission line. Each node is provided with a first wavelength division section for performing wavelength division operation on a first input optical signal which is a wavelength multiplexed optical signal including respective wavelength components of $\lambda 1$ to $\lambda n$ wavelength inputted from the input terminal into the respective wavelength components, and outputting n first wavelength divided lights comprising the respective wavelength components, a first wavelength multiplexing section for wavelength-multiplexing the respective optical signals having the respective wavelength components of $\lambda 1$ to $\lambda n$ wavelength inputted from the input terminal, and outputting a second multiplexed optical signal, a second wavelength division section for performing wavelength division operation on a second input optical signal which is a wavelength multiplexed optical signal including respective wavelength components of $\lambda n+1$ to $\lambda n+n$ wavelength inputted from the input terminal into the respective wavelength components, and outputting n second wavelength divided lights comprising the respective wavelength components, a second wavelength multiplexing section for wavelength-multiplexing the respective optical signals having the respective wavelength components of $\lambda n+1$ to $\lambda n+n$ wavelength inputted from the input terminal, and outputting a second multiplexed optical signal, and n insertion division sections, each of n insertion division sections includes the first wavelength divided light input section and second wavelength divided light input section for receiving the first wavelength divided light having the wavelength component of $\lambda i$ ($1 \leq i \leq n$) wavelength and the second divided light having the wavelength component of $\lambda i+n$ wavelength corresponding to the wavelength divided light from n first wavelength divided lights and n second wavelength divided lights, and first insertion optical signal input section and second insertion optical signal input section for receiving the first insertion optical signal having the same wavelength as the wavelength $\lambda i$ ($1 \leq i \leq n$) and the second insertion optical signal having the wavelength of $\lambda i+n$ wavelength corresponding to the first insertion optical signal, and respectively outputting a first insertion optical signal and a second insertion optical signal to the first wavelength multiplexing section and the second wavelength multiplexing section. Each node is provided with the first optical turnout provided between the counter-clockwise optical transmission line and the first wavelength division section for branching partially the first input optical signal outputted from the counter-clockwise optical transmission line to output the first turnout input optical signal, the second optical turnout provided between the clockwise optical transmission line and the second wavelength division section for branching partially the second input optical signal outputted from the clockwise optical transmission line to output the second turnout input optical signal, a first 2×1 optical switch for selecting the first input optical signal and the second turnout input optical signal and outputting to the first wavelength division section, a second 2×1 optical switch for selecting the second input optical signal and the first turnout input optical signal and outputting to the second wavelength division section, a first optical coupler for coupling the first multiplexing optical signal and the second turnout multiplexing optical signal, a second optical coupler for coupling the second multiplexing optical signal and the first turnout multiplexing optical signal, a first 1×2 optical path selection means provided between the first wavelength multiplexing section and the first optical coupler for selecting and outputting the first multiplexing optical signal to the first optical coupler and the second optical coupler, and a second 1×2 optical path selection means provided between the second wavelength multiplexing section and the second optical coupler for selecting and outputting the second multiplexing optical signal to the second optical coupler and the first optical coupler.

Each node is further provided with a first optical pre-amplifier provided between the counter-clockwise optical transmission line and the first wavelength division section for optically amplifying the inputted first input optical signal and outputting to the first wavelength division section, and a second optical pre-amplifier provided between the clockwise optical transmission line and the second wavelength division section for optically amplifying the inputted second input optical signal and outputting to the second wavelength division section. Further, a first booster optical amplifier is provided between the first wavelength multiplexing section and the counter-clockwise optical transmission line for optically amplifying the first multiplexing optical signal and outputting to the counter-clockwise optical transmission line, and a second booster optical amplifier is provided between the second wavelength multiplexing section and the clockwise optical transmission line for optically amplifying the second multiplexing optical signal and outputting to the clockwise optical transmission line.

As a sixth basic structure, in addition to the above-mentioned structure, each node is further provided with an first n×n optical switch provided subsequently to the first wavelength division section for connecting selectively respective optical signals having wavelengths of $\lambda 1$ to $\lambda n$ inputted from a first wavelength division section to n insertion division sections, and a second n×n optical switch provided subsequently to the second wavelength division section for connecting selectively respective optical signals having wavelengths of $\lambda 1$ to $\lambda n$ inputted from a second wavelength division section to n insertion division sections.

Further as the fourth basic structure of the present invention, instead of the above-mentioned structure, each node is provided with p (p is an integer of n or lager hereinafter) insertion division sections including n insertion division sections, a first n×p optical switch provided subsequently to the first wavelength division section for connecting selectively n optical signals having wavelengths of $\lambda 1$ to $\lambda n$ inputted from the wavelength division section to the p insertion division sections, a second n×p optical switch provided subsequently to a first wavelength division section for connecting selectively n optical signals having wavelengths of $\lambda 1$ to $\lambda n$ inputted from the wavelength division section to the p insertion division sections, a first p×n optical switch provided preceding to the first wavelength multiplexing section for connecting selectively p optical signals inputted from each insertion division section to each input terminal of the first wavelength multiplexing section, and a second p×n optical switch provided preceding to the second wavelength multiplexing section for connecting selectively p optical signals inputted from each insertion division section to each input terminal of the second wavelength multiplexing section. On the other hand, each insertion division section is further provided with a wavelength selection section for selecting an optical signal wavelength out of the wavelengths of $\lambda 1$ to $\lambda n$.

Each node is further provided with a reception side 2×2 optical switch for switching selectively each other the first first wavelength divided light out of n first wavelength divided lights and first second wavelength divided light out of n second wavelength divided lights and outputting to the first wavelength divided light input section of the first insertion division section out of n insertion division sections and the second insertion division section, and is provided with a transmission side 2×2 optical switch for switching selectively each other the first first insertion optical signal out of n first insertion optical signals and first second insertion optical signal out of n second insertion optical signals and outputting to the first wavelength multiplexing section and the second wavelength multiplexing section.

As an eighth basic structure, the wavelength division multiplexing optical transmission device having a ring structure of the present invention is a wavelength division multiplexing optical transmission device having a ring structure comprising m nodes, in which adjacent nodes are connected to each other with an optical transmission line to form a ring structure. The optical transmission line comprises a clockwise optical transmission line and counter-clockwise optical transmission line. Each node is provided with a first wavelength division section for performing wavelength division operation on the first input optical signal which is a wavelength multiplexed optical signal including respective wavelength components of $\lambda 1$ to $\lambda n$ wavelength inputted from the input terminal into the respective wavelength components and outputting n first wavelength divided lights comprising the respective wavelength components, a first wavelength multiplexing section for wavelength-multiplexing the respective optical signals having the respective wavelength components of $\lambda 1$ to $\lambda n$ wavelength inputted from the input terminal, and outputting a second multiplexed optical signal, a second wavelength division section for performing wavelength division operation on a second input optical signal which is a wavelength multiplexed optical signal including respective wavelength components of λn+1 to λn+n wavelength inputted from the input terminal into the respective wavelength components and outputting n second wavelength divided light comprising the respective wavelength components, a second wavelength multiplexing section for wavelength-multiplexing the respective optical signals having the respective wavelength components of λn+1 to λn+n wavelength inputted from the input terminal, and outputting a second multiplexed optical signal. Each node is further provided with at least one insertion division section including a first receiver for converting an input optical signal to an electric signal, a second receiver for converting an input optical signal to an electric signal, a first transmitter for converting an electric signal to an optical signal to output, and a second transmitter for converting an electric signal to an optical signal to output. Each node is also provided with a reception side 2×2 optical switch for switching selectively each other at least one first wavelength divided light out of n first wavelength divided lights and the second wavelength divided light having the wavelength component of wavelength λi+n corresponding to the wavelength λi of the first wavelength divided light, and outputting to the first receiver or the second receiver of the insertion division section corresponding to the wavelength λi or λi+n out of the insertion division sections.

Each node is still further provided with a transmission side 2×2 optical switch for switching selectively each other the first insertion optical signal corresponding to one first wavelength divided light having a wavelength of λ1 out of n first insertion optical signals and the second insertion optical signal having a component of λ1+n wavelength out of n second insertion optical signal and outputting to the first wavelength multiplexing section and second wavelength multiplexing section, a first optical turnout provided between the counter-clockwise optical transmission line and the first wavelength division section for branching partially the first input optical signal outputted from the counter-clockwise optical transmission line to output the first turnout input optical signal, a second optical turnout provided between the clockwise optical transmission line and the second wavelength division section for branching partially the second input optical signal outputted from the clockwise optical transmission line to output the second turnout input optical signal, a first 2×1 optical switch for selecting the first input optical signal and the second turnout input optical signal and outputting to the first wavelength division section, a second 2×1 optical switch for selecting the second input optical signal and the first turnout input optical signal and outputting to the second wavelength division section, a first optical coupler for coupling the first multiplexing optical signal and the second turnout multiplexing optical signal, the second optical coupler for coupling the second multiplexing optical signal and the first turnout multiplexing optical signal, a first 1×2 optical path selection means provided between the first wavelength multiplexing section and the first optical coupler for selecting and outputting the first multiplexing optical signal to the first optical coupler and the second optical coupler, and a second 1×2 optical path selection means provided between the second wavelength multiplexing section and the second optical coupler for selecting and outputting the second multiplexing optical signal to the second optical coupler and the first optical coupler.

Each node is further provided with a first optical pre-amplifier provided between the counter-clockwise optical transmission line and the first wavelength division section for optically amplifying the inputted first input optical signal and outputting to the first wavelength division section, and a second optical pre-amplifier provided between the clockwise optical transmission line and the second wavelength division section for optically amplifying the inputted second input optical signal and outputting to the second wavelength division section. Each node is further provided with a first booster optical amplifier provided between the first wavelength multiplexing section and the counter-clockwise optical transmission line for optically amplifying the first multiplexing optical signal and outputting to the counter-clockwise optical transmission line, and a second booster optical amplifier provided between the second wavelength multiplexing section and the clockwise optical transmission line for optically amplifying the second multiplexing optical signal and outputting to the clockwise optical transmission line.

In the above-mentioned first basic structure of the wavelength division multiplexing optical transmission device having a ring structure of the present invention, because only two high speed signal transmission reception interface sections are used in an insertion division device (ADM) in each node, thus a very inexpensive and small-sized product is realized in comparison with a product manufactured by the first conventional art. Because in the first basic structure recovery operation is performed by means of 4×4 optical switch and the structure has many by-passes for by-bypassing failure points in comparison with the second conventional art, thus the product of the present invention is excellent in reliability.

In the second basic structure of the present invention, in addition to the action and effect of the above-mentioned first basic structure, because this basic structure is provided with nn optical switches for arbitrarily selecting wavelength channel to be inputted to the insertion division device (ADM), and (n−1):1 redundant structure becomes available by providing protection wavelength, thus the product is more excellent in reliability.

In the third basic structure of the present invention, in addition to the action and effect of the above-mentioned first basic structure, because in the third basic structure each wavelength signal received from a transmission line is inputted to arbitrary insertion division devices, the wavelength to be outputted from each insertion division device (ADM) can be set arbitrarily, and n:(p−n) redundant structure is available, thus the product is excellent in reliability. Because recovery operation performed when an insertion division device (ADM) gets failure by way of operation closed in the failure node, thus the product is excellent in operability.

In the fourth basic structure of the present invention, in addition to the action and effect of the above-mentioned first basic structure, because in the fourth basic structure wavelength signals which do not require division/insertion of the data signal in a node are outputted to a transmission line as it is optical signals, cross connector operation is performed by means of 2×2 optical switch, and a multiplexing terminal device having no cross connector section is used instead of an insertion division device (ADM), thus a more inexpensive system is provided.

In the fifth basic structure of the present invention, because only two high speed transmission reception interface sections are used in an insertion division device (ADM) in each node, thus a very inexpensive and small-sized product is realized in comparison with a product manufactured by way of the first conventional art. Because wavelength channels for transmission during working condition are set separately for clockwise transmission line and counter-clockwise transmission line, the transmission path is by-passed to the other transmission line when a transmission line gets failure, and only two transmission line fibers are sufficient for operation, thus the product is excellent in economy as a whole network.

In the sixth basic structure of the present invention, in addition to the action and effect of the above-mentioned fifth basic structure, because in the sixth basic structure a nn optical switch for arbitrarily selecting a wavelength channel to be inputted to a insertion division device (ADM), recovery operation can be performed when an insertion division device (ADM) gets failure by providing a protection wavelength, thus the product is excellent in reliability.

In the seventh basic structure of the present invention, in addition to the action and effect of the above-mentioned sixth basic structure, because in this basic structure each wavelength signal received from a transmission line is inputted to an arbitrary insertion division device, the wavelength to be outputted from each insertion division device (ADM) can be set arbitrarily, and n:(p−n) redundant structure is available, thus the product is excellent in reliability. Because recovery operation performed when an insertion division device (ADM) gets failure by way of operation closed in the failure node, thus the product is excellent in operability.

In the eighth basic structure of the present invention, in addition to the action and effect of the above-mentioned fifth basic structure, because in the eighth basic structure wavelength signals which do not require division/insertion of the data signal in a node are outputted to a transmission line as it is optical signals, cross connector operation is performed by means of 2×2 optical switch, a multiplexing terminal device having no cross connector section is used instead of an insertion division device (ADM), thus a more inexpensive system is provided.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein.

DETAILED DESCRIPTION OF THE PREFERRED EMBODIMENTS

Next, an optical communication node and a wavelength division multiplexing optical transmission device having a ring structure comprising the optical communication nodes of the present invention will be described in detail hereinafter with reference to the drawings.

Figure 1:
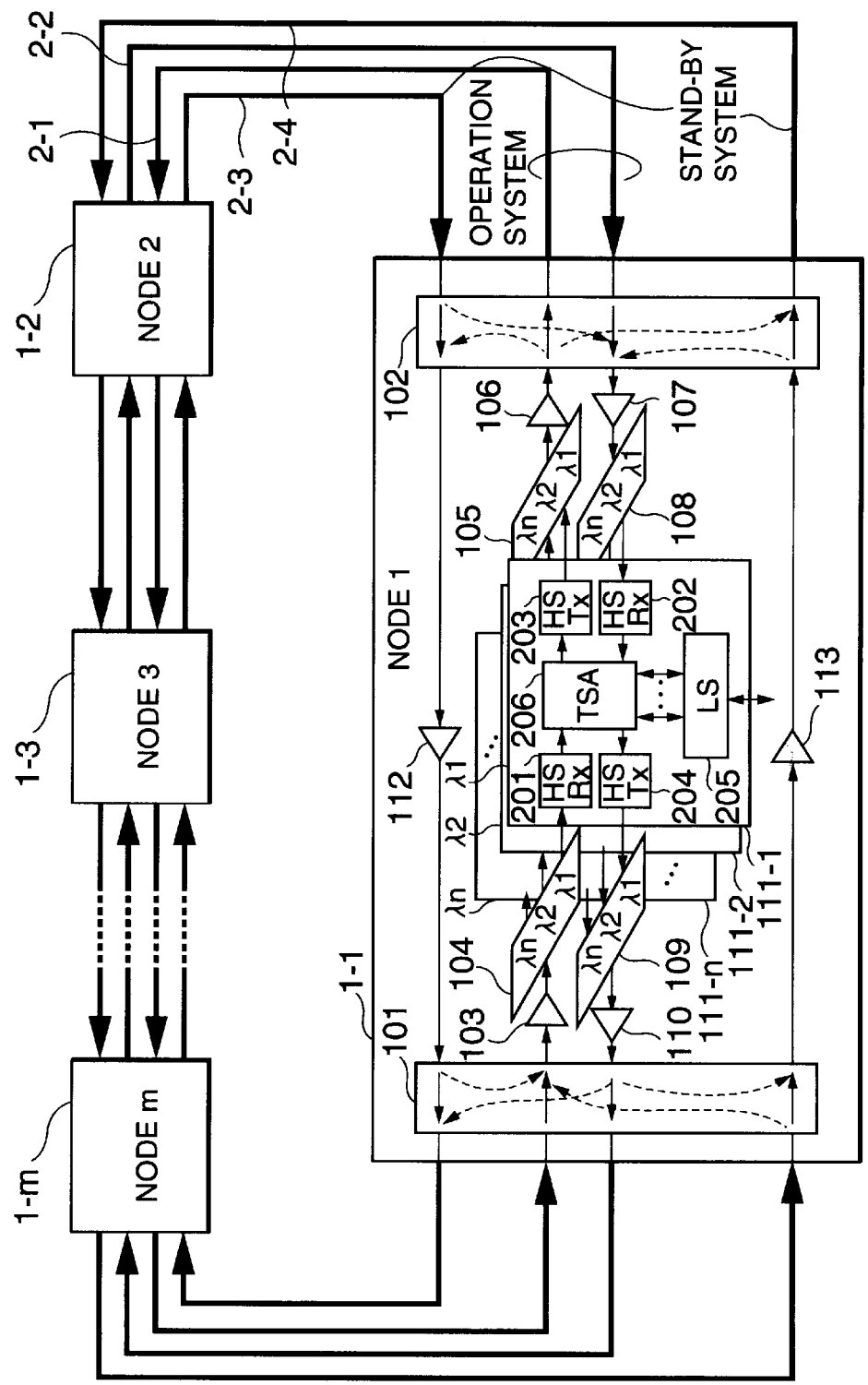
FIG. 1 is a block diagram for illustrating the structure of the first embodiment of a wavelength division multiplexing optical transmission device having a ring structure of the present invention.

An exemplary structure of the first embodiment of an optical communication node and a wavelength division multiplexing optical transmission device having a ring structure comprising the optical communication nodes of the present invention are shown in FIG. 1. FIG. 1 shows an example of the structure of an optical transmission device having a ring structure comprising m nodes, the respective nodes perform optical wavelength division multiplexing of wavelengths $\lambda 1$ to $\lambda n$ for transmission of signals.

In FIG. 1, 1-1 to 1-m represent optical insertion division nodes, 2-1 to 2-4 represent transmission line optical fibers (2-1: counter-clockwise working operation system, 2-2: clockwise working operation system, 2-3: clockwise stand-by system, and 2-4: counter-clockwise stand-by system), 101 and 102 represent 4×4 optical switches, 103 represents a first optical pre-amplifier, 104 represents a first wavelength division section, 105 represents a first wavelength multi-plexing section, 106 represents a first optical booster amplifier, 107 represents a second optical amplifier, 108 represents a second wavelength division section, 109 represents a second wavelength multiplexing section, 110 represents a second optical booster amplifier, 111-1 to 111-n represent insertion division (ADM) devices, 112 and 113 represent optical junction amplifiers, 201 and 202 represent high speed signal receiving interface section, 203 and 204 represent high speed signal transmission interface sections, 205 represents a low speed signal interface section, and 206 represents a cross connector section.

m nodes are connected to form a ring comprising two lines forming a two-way working (or normal) operation system, and another two lines comprising a two-way stand-by (or by-pass) system, namely, comprising total four transmission line optical fibers. The respective nodes receive optical signals that n wavelengths of wavelength $\lambda 1$ to $\lambda n$ are wavelength division multiplexed from the optical fiber transmission lines.

The respective nodes are operated under the working condition as described herein above, that is, no problem occurs in the network system. An optical signal received from a transmission line optical fiber of the counter-clockwise operation system is supplied to the optical pre-amplifier 103 through the 4×4 optical switch 101, amplified by the pre-amplifier 103, and divided to n wavelengths of $\lambda 1$ to $\lambda n$ by the wavelength division section 104. n optical signals of $\lambda 1$ to $\lambda n$ subjected to wavelength division are inputted to ADM devices 111-1 to 111-n, respectively. In detail, the optical signal of 1 is inputted to the ADM device 111-1, the optical signal of $\lambda 2$ is inputted to the ADM device 111-2, and the optical signal of $\lambda n$ is inputted to the ADM device 111-n.

n optical signals of wavelengths $\lambda 1$ to $\lambda n$ are outputted from the respective ADM devices 111-1 to 111-n. In detail, the optical signal of wavelength $\lambda 1$ is outputted from the ADM device 111-1, the optical signal of wavelength $\lambda 2$ is outputted from the ADM device 111-2, and the optical signal of wavelength $\lambda n$ is outputted from the ADM device 111-n. n optical signals of wavelengths $\lambda 1$ to $\lambda n$ outputted from the respective ADM devices 111-1 to 111-n are subjected to wavelength division multiplexing in the wavelength multi-plexing section 105, amplified by the optical booster amplifier 106 as one optical signal, and transmitted to the optical fiber transmission line of the counter-clockwise operation system through the 4×4 optical switch 102. Similarly, an optical signal which is received and transmitted through the clockwise operation system 2-2 is subjected to multiplexing division involving wavelengths $\lambda 1$ to $\lambda n$ in the same manner as performed on the optical signal through the counter-clockwise operation system 2-1. For the clockwise operation system, the optical pre-amplifier 107, wavelength division section 108, wavelength multiplexing section 109, and optical booster amplifier 110 are used.

An optical fiber amplifier provided with an amplification optical fiber containing a rare earth element and an excitation optical source for emitting excited beam into the amplification optical fiber, or a semiconductor optical amplifier that amplifies directly a incident beam by injecting a current into an optical semiconductor may be used, for example, as the above-mentioned optical pre-amplifier and optical booster amplifier. In this embodiment, optical amplifiers 103 and 107, and optical booster amplifiers 106 and 110 are provided prior to all the wavelength optical division sections 104 and 108 and wavelength multiplexing sections 105 and 109; however, these components may be omitted based on particular system requirements.

Next, a recovery operation that is performed when a problem occurs in the transmission line of the first embodiment is described with reference to FIG. 2.

In FIG. 2(a) during working (or normal) operation, data signals are received and transmitted between the node 2 and node 5 through two operation transmission lines. In the node 2 and node 5, data signals are inputted to and outputted from the low speed signal interface in a node and the path is set by the cross connector section.

Operation that is performed when two operation transmission lines are disconnected between the node 2 and the node 3 is shown in FIG. 2(b). In such a case, the 4×4 optical switch of the node 2 performs path change from the connection that allows optical signals to be communicated through the operation transmission lines between the node 2 and node 3, to the connection that allows optical signals to be communicated through the stand-by transmission lines between the node 2 and node 3. The 4×4 optical switch of the node 3 performs path change from the connection that allows optical signals to be communicated through the operation transmission lines between the node 2 and node 3, to the connection that allows optical signals to be communicated through the stand-by transmission lines between the node 2 and node 3. Thereby the communication of the data signal is secured by by-passing the disconnected transmission lines.

Operation that is performed when both the operation transmission line and stand-by transmission line are disconnected between the node 2 and node 3 is described in FIG. 2(c). In such a case, the 4×4 optical switch of the node 2 performs path change from the connection that allows optical signals to be communicated through the operation transmission lines between the node 2 and node 3, to the connection that allows optical signals to be communicated through the opposite stand-by transmission lines between the node 2 and node 1. The 4×4 optical switch of the node 3 performs path change from the connection that allows optical signals to be communicated through the operation transmission lines between the node 2 and node 3, to the connection that allows optical signals to be communicated through the opposite stand-by transmission lines between the node 3 and node 4.

Thereby, the communication of the data signal is secured by by-passing the disconnected transmission lines.

Operation that is performed when the node 3 experiences a failure is shown in FIG. 2(d). In such a case, the 4×4 optical switch of the node 2 performs path change from the connection that allows optical signals to be communicated through the operation transmission lines between the node 2 and node 3, to the connection that allows optical signals to be communicated through the opposite stand-by transmission lines between the node 2 and node 1. The 4×4 optical switch of the node 4 performs path change from the connection that allows optical signals to be communicated through the operation transmission lines between the node 4 and node 3, to the connection that allows optical signals to be communicated through the opposite stand-by transmission lines between the node 4 and node 5. Thereby, the communication of the data signal is secured by by-passing the disconnected transmission lines.

Figure 3:
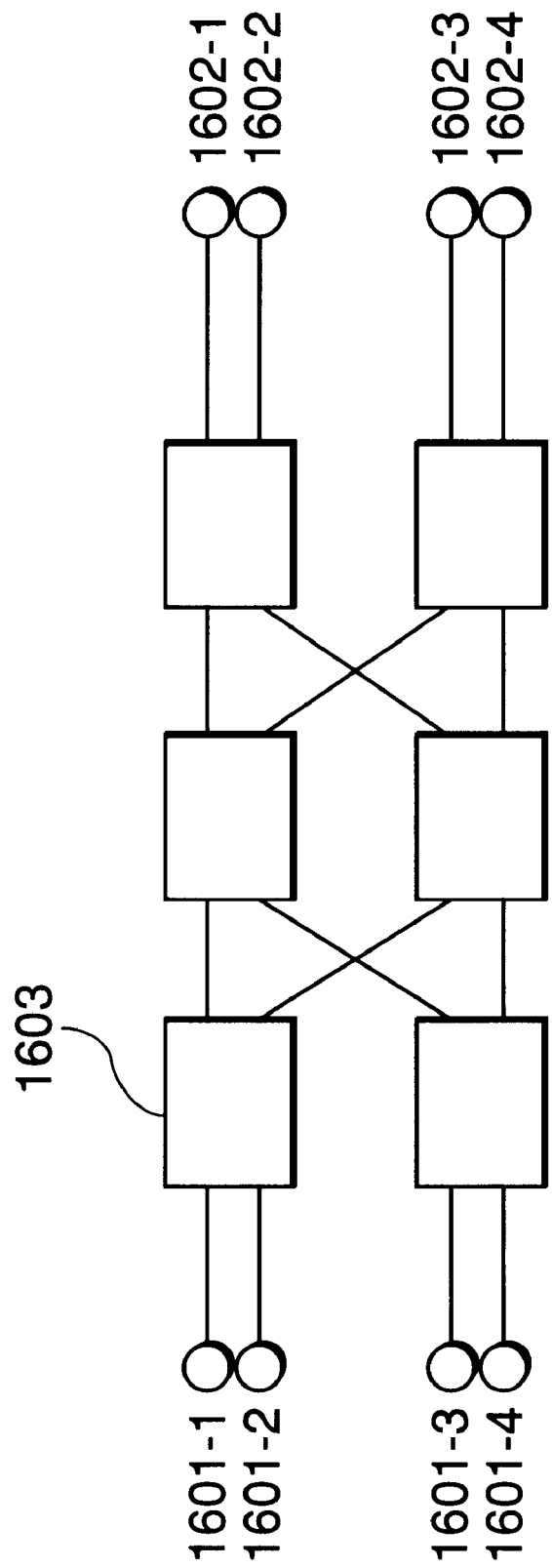
FIG. 3 is a diagram for illustrating an exemplary structure of a 4×4 optical switch used in the first embodiment of the wavelength division multiplexing optical transmission device having a ring structure of the present invention.

A 4×4 optical matrix switch used in the optical transmission device of the present invention shown in FIG. 1 has the structure shown in FIG. 3. In FIG. 3, 1601-1 to 1601-4 are optical signal input terminals, 1602-1 to 1602-4 are optical signal output terminals, and 1603 is a 2×2 optical switch element.

In FIG. 3, four input optical signals are inputted to the 4×4 optical matrix switch. The 4×4 matrix switch sets the path of the four optical signals while the four optical signals pass the total of six 2×2 optical switch elements, and the four optical signals are outputted to any one of the output terminals 1602-1 to 1602-4 respectively. A ferroelectric material, such as LiNbO3, may be used for a 2×2 optical switch element 1603. A 2×2 optical switch element 1603 is disposed usually on a substrate in a matrix pattern, and an optical waveguide is used for connection between switch elements.

Figure 4:
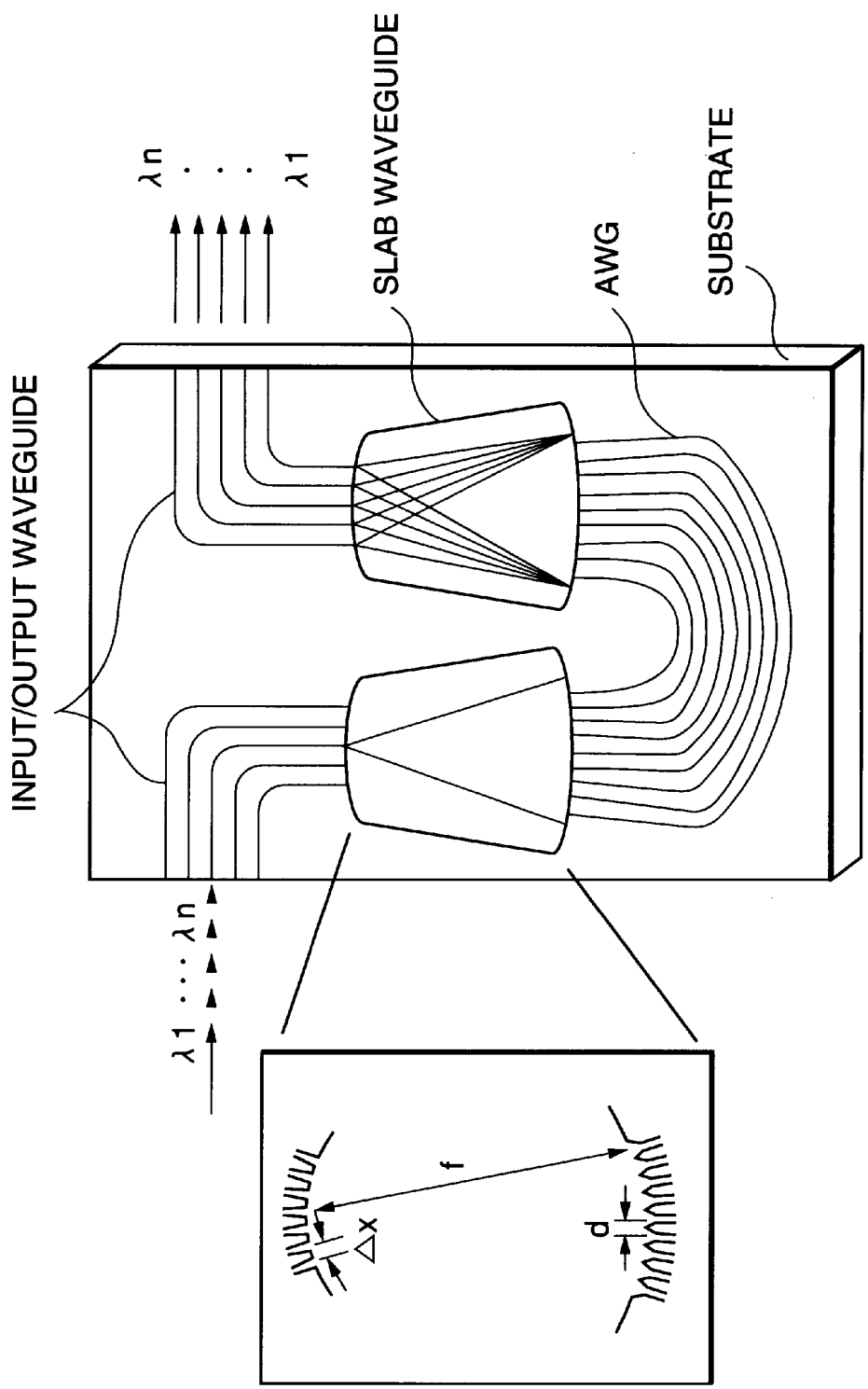
FIG. 4 is a diagram for illustrating an exemplary structure of an AWG multiplexing branching module used in the first embodiment of the wavelength division multiplexing optical transmission device having a ring structure of the present invention.

In this and other embodiments, a multiplexing-branching device comprising arrayed waveguide grating (AWG) is used as the wavelength division section and wavelength multiplexing section. FIG. 4 shows the structure of the AWG multiplexing-branching device. The AWG multiplexing-branching device is a device to which planar lightwave circuit technology (PLC) is applied, and comprises a slab waveguide and AWG provided on a silicon substrate.

Figure 5:
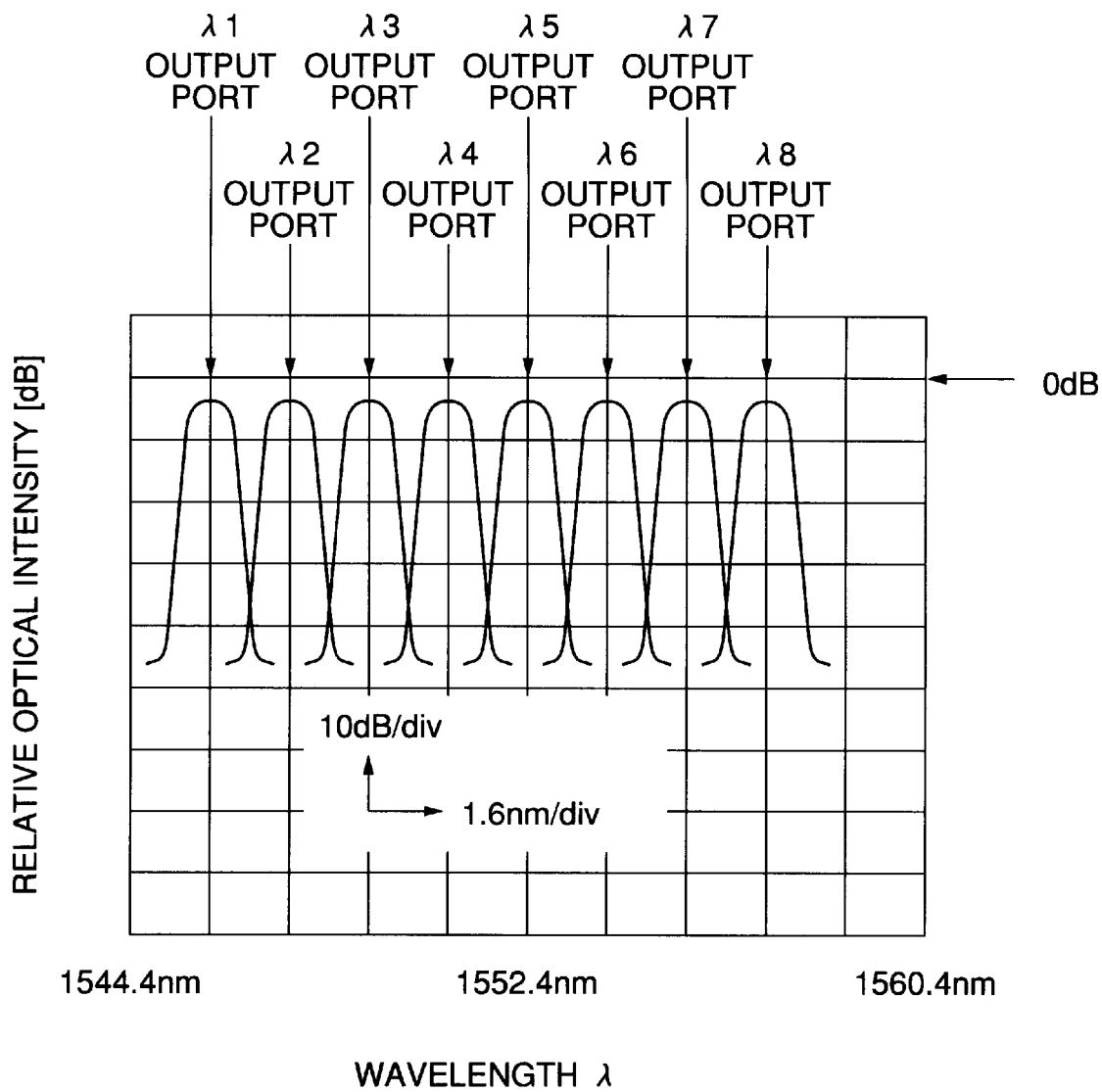
FIG. 5 is a graph for describing an exemplary characteristics of the AWG multiplexing branching module shown in FIG. 4.

An input wavelength-multiplexed optical signal of $\lambda 1$ to $\lambda n$ is diffracted by the slab waveguide to diverge and distributed to AWG with the same phase. Because of difference in optical path length in the AWG, the wavelengths of the optical signal interfere with each other on the output side of the slab waveguide, and the optical signal is outputted to the output arrayed waveguide as divided lights having different wavelengths. The AWG multiplexing-branching device functions as it were a prism. When optical signals having various wavelengths are inputted from the output side in the drawing, the AWG multiplexing-branching device functions as a wavelength multiplexer. An exemplary characteristic of the AWG multiplexing-branching device is shown in FIG. 5.

Figure 20:
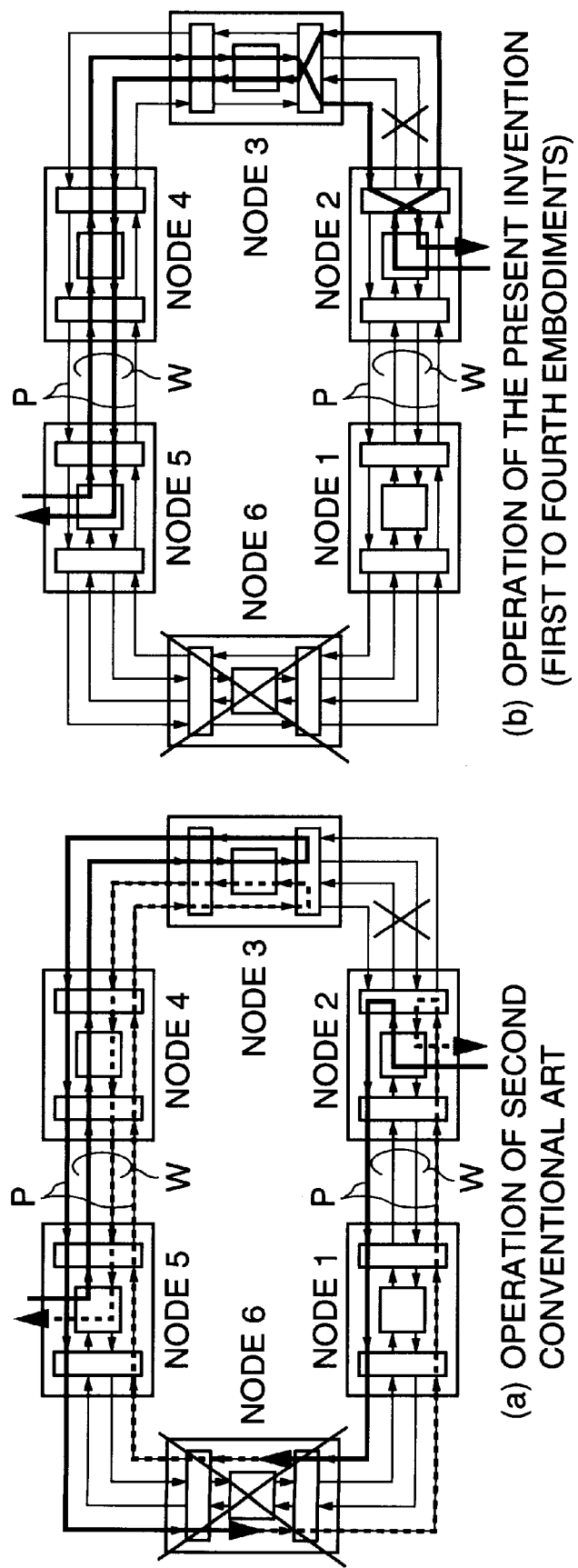
FIG. 20 is a set of diagrams for illustrating recovery operation from failure in comparison between an optical transmission device according to the conventional art and a wavelength division multiplexing optical transmission device having a ring structure of the present invention.

According to the first embodiment of the present invention, only two high speed signal transmission-receiving interface sections are used in the insertion division (ADM) device in each node. Therefore, the device can be very inexpensive and made small sized in comparison with the first conventional art. Further, the 4×4 optical switch performs failure recovery operation in the first embodiment and the device has many stand-by paths for by-passing the failure path. Therefore, the device has high reliability in comparison with the second conventional art. Even in the case that a problem can not be avoided in the conventional art shown in FIG. 20(*a*), the problem can be avoided by applying this invention.

Next, a second embodiment having the second basic structure of the optical communication node and the wavelength division multiplexing optical transmission device having a ring structure comprising such optical communication nodes of the present invention is described.

Figure 6:
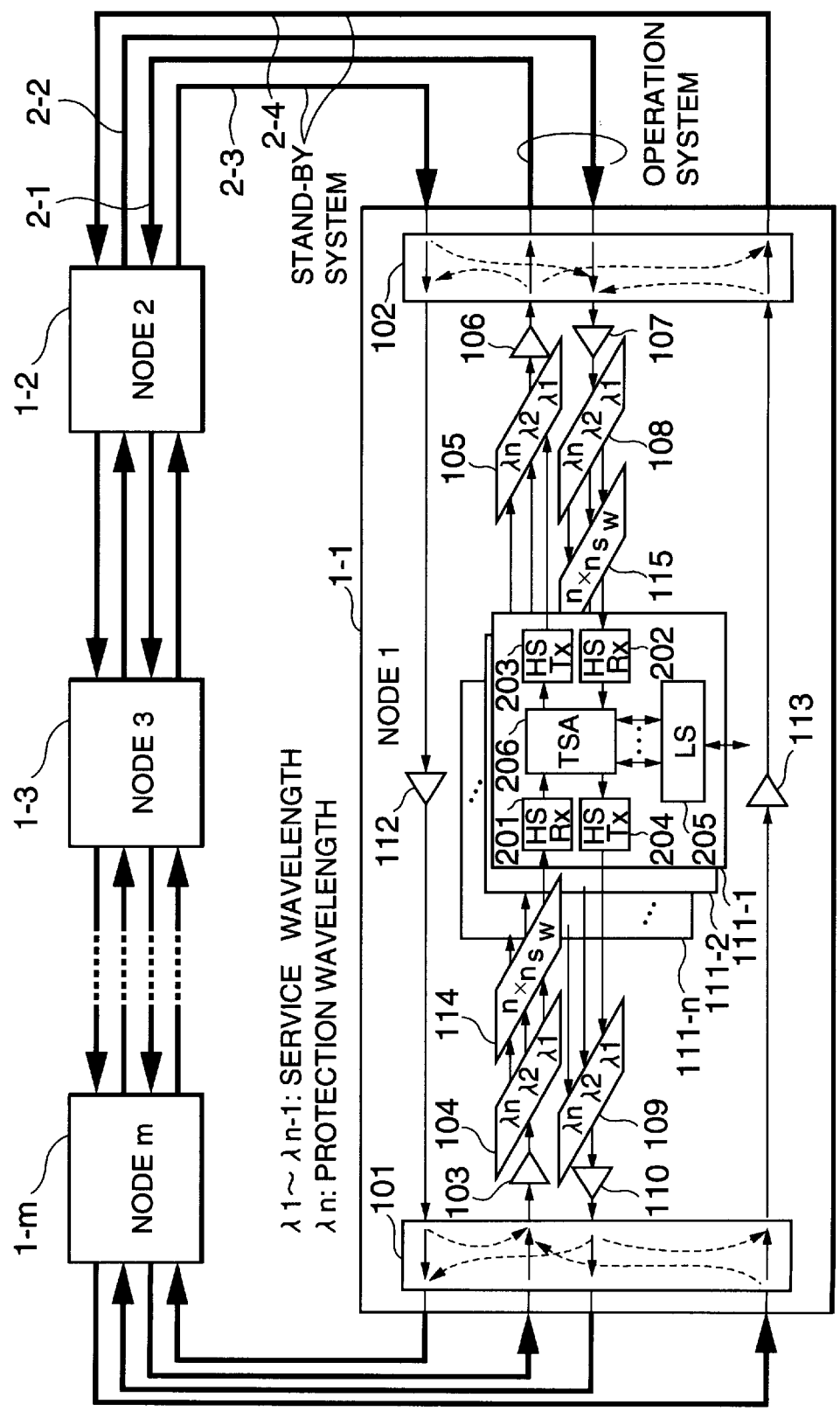
FIG. 6 is a block diagram for illustrating the structure of the second embodiment of a wavelength division multiplexing optical transmission device having a ring structure of the present invention.

FIG. 6 shows a block diagram for illustrating the structure of the second embodiment of a wavelength division multiplexing optical transmission device having a ring structure of the present invention. Components in FIG. 6 having the same numbers as described in FIG. 1 represent the same components shown in FIG. 1. As for other numbers, 114 and 115 represents n×n optical switches.

In FIG. 6, two n×n optical switch 114 and 115 for connecting selectively an optical signal having wavelengths of $\lambda 1$ to $\lambda n$ are provided subsequent to the wavelength division sections 104 and 108, respectively. The n×n optical switch inputs the optical signal received from the transmission line to an arbitrary insertion division device to change the path of the signal. In the structure shown in FIG. 6, $\lambda 1$ to $\lambda n-1$ are set as the service wavelength and n is set as the protection wavelength. When any of the insertion division devices 111-1 to 111-(n-1) gets a failure, the path is switched to the path passing via the insertion division device 111-n.

Figure 7:
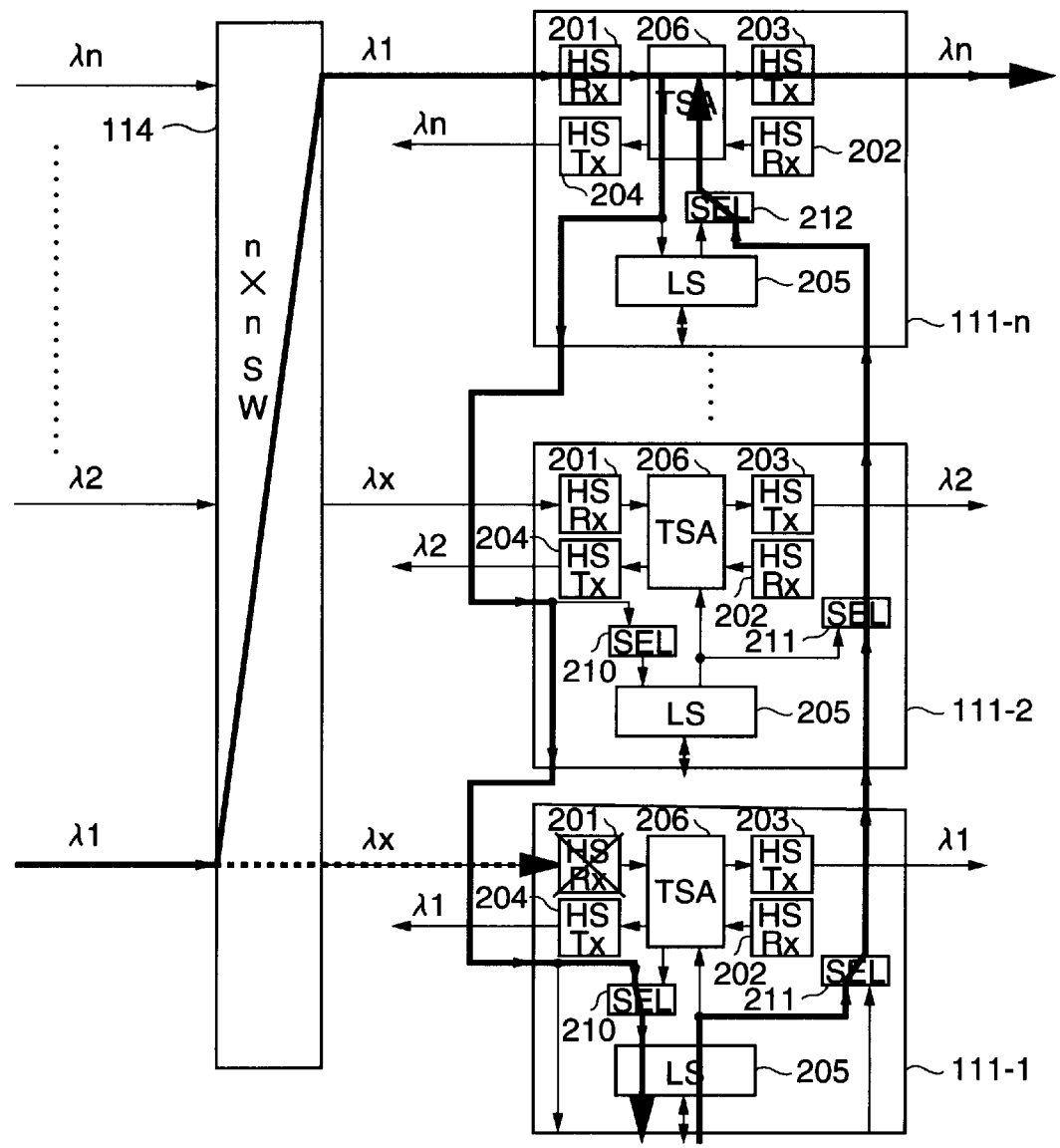
FIG. 7 is a diagram for illustrating recovery operation from failure in the second embodiment of the wavelength division multiplexing optical transmission device having a ring structure of the present invention.

Operation of the device performed when an insertion division device experiences a failure is shown in FIG. 7. Components in FIG. 7 having the same numbers as described in FIG. 6 represent the same components shown in FIG. 6. As for other numbers, 210 and 211 are 2:1 selectors.

In the structure shown in FIG. 7, an optical signal having a wavelength of $\lambda 1$ is inputted to the insertion division device 111-1 through the n×n optical switch 114 during working (or normal) operation for insertion and division of the data signal, and thereafter outputted again as an optical signal having a wavelength of $\lambda 1$. If the high speed signal receiving interface section 201 in the insertion division device 111-1 experiences a failure, the n×n optical switch switches the path so that the input optical signal having a wavelength of $\lambda 1$ is connected to the insertion division device 111-n. The optical signal inputted to the insertion division device 111-n is subjected to photoelectric conversion, multiple division, insertion division of data signal, and electric/optical conversion, and outputted as an optical signal having a wavelength of $\lambda n$ to the transmission line. For data signal to be divided from/inserted to the low speed signal interface section, the 2:1 selectors 210 to 212 are switched so that the cross connector section in the insertion division device 111-n is connected to the low speed signal interface section 205 in the insertion division device 111-1. The n×n optical switch in the next node is switched so that the optical signal having a wavelength of $\lambda n$ outputted from the insertion division device 111-n is inputted to the insertion division device 111-1. Thereby, the communication is recovered by by-passing the failure of the insertion division device.

Operations other than that described herein above are the same as described in the first embodiment.

According to the second embodiment of the present invention, in addition to the effect of the above-mentioned first embodiment, the n×n optical switch for selecting an arbitrary wavelength channel inputted to the insertion division (ADM) device is provided, the device can cope with the failure of the insertion division (ADM) device by providing protection wavelength, thereby the reliability is high.

Next, a third embodiment having a third basic structure of an optical communication node and a wavelength division multiplexing optical transmission device having a ring structure comprising such optical communication nodes of the present invention is described.

Figure 8:
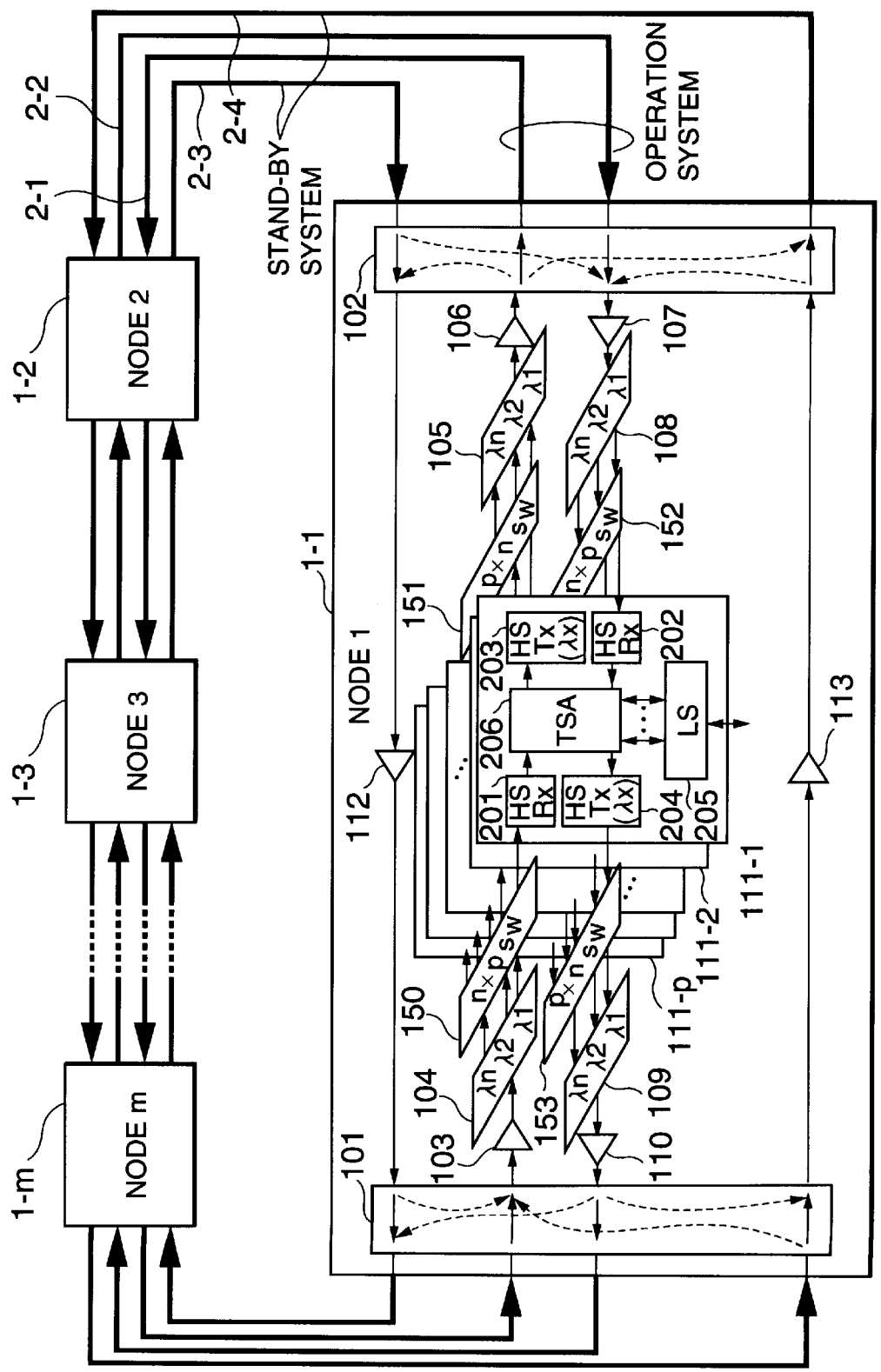
FIG. 8 is a block diagram for illustrating the structure of the third embodiment of a wavelength division multiplexing optical transmission device having a ring structure of the present invention.

FIG. 8 is a block diagram for illustrating the structure of the third embodiment of a wavelength division multiplexing optical transmission device having a ring structure of the present invention. Components in FIG. 8 having the same numbers as described in FIG. 1 represent the same components shown in FIG. 1. As for other numbers, 150 and 152 are n×n optical switches, 151 and 153 are p×n optical switches, and 207 and 208 are high speed signal interface sections having transmission wavelength setting function.

In the structure shown in FIG. 8, the n×p optical switches 150 and 152 are provided subsequent to the wavelength division sections 104 and 108, respectively, so that the optical signal having wavelengths of λ1 to λn is connected selectively to p insertion division devices 111-1 to 111-p subsequent to the n×p optical switches 150 and 152.

The n×p optical switches 151 and 153 are provided respectively subsequent to the p (p×n) insertion division devices 111-1 to 111-p so that the optical signals having wavelengths of λ1 to λn that are outputs from the insertion division device are connected selectively to the wavelength multiplexing sections 305 and 313, the high speed signal transmission interface in the insertion division device selects arbitrarily wavelengths λ1 to λn of the optical signal to be transmitted. The n×p and p×n optical switches connect the wavelength which is set and outputted by the insertion division device to prescribed wavelength input ports of the wavelength multiplexing sections 105 and 109.

Figure 9:
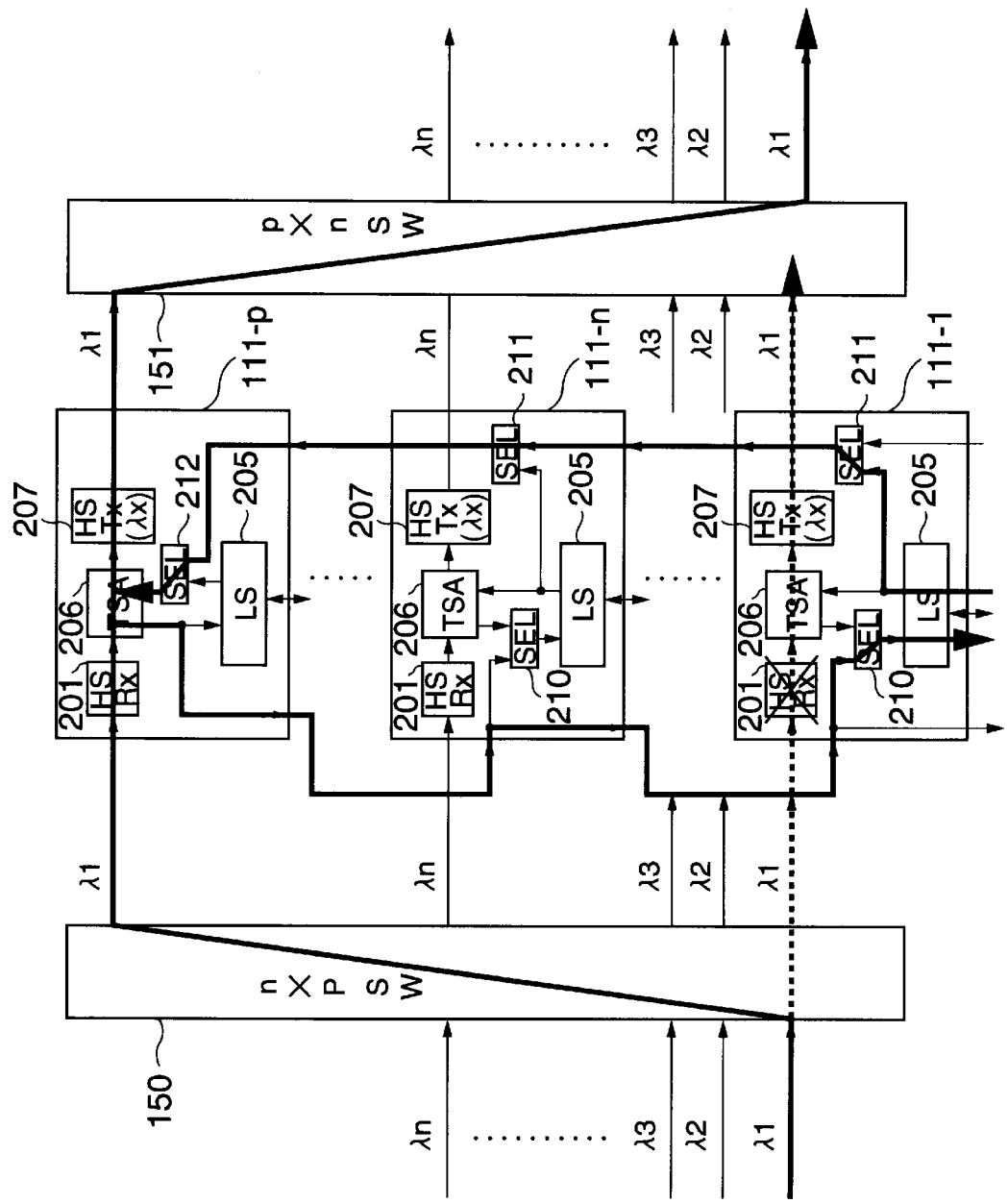
FIG. 9 is a diagram for illustrating recovery operation from failure in the third embodiment of the wavelength division multiplexing optical transmission device having a ring structure of the present invention.

FIG. 9 shows operation performed when an insertion division device experiences a failure in the third embodiment of the present invention shown in FIG. 8. Components in FIG. 9 having the same numbers as described in FIG. 8 represent the same components shown in FIG. 8. As for other numbers, 210 and 211 are 2:1 selectors.

In the structure shown in FIG. 9, an optical signal having a wavelength of λ1 is inputted to the insertion division device 111-1 through the n×p optical switch 150, and the data signal is subjected to insertion division operation during working operation. Thereafter, an optical signal having a wavelength of λ1 is outputted again through the p×n optical switch 151. In the case that the high speed signal receiving interface section 201 in the insertion division device 111-1 experiences a failure, the n×p optical switch 150 switches the path so that the input optical signal having a wavelength of λ1 is connected to the insertion division device 111-p.

The optical signal having a wavelength λ1 inputted to the insertion division device 111-p is subjected to optical/electric conversion, multiplexing division, insertion division of the data signal, and electric/optical conversion, and outputted as a optical signal having a wavelength of λ1.

The p×n optical switch 151 changes the path so that the optical signal having a wavelength of λ1 inputted from the insertion division device 111-p is outputted to the λ1 input port of the wavelength multiplexing section. For a signal that is divided from/inserted to the low speed signal interface section, the 2:1 selectors 210 to 212 are switched so that the cross connector section in the insertion division device 111-p is connected to the low speed signal interface section 205 in the insertion division device 111-1. Thereby the communication is recovered by by-passing the failed insertion division device.

Operations of components other than that described herein above are the same as that described in the first embodiment of the present invention.

According to the third embodiment of the present invention, in addition to the effect of the above-mentioned first embodiment, because signals having the respective wavelengths received from the transmission line are inputted to arbitrary insertion division devices and the wavelength outputted from each insertion division device (ADM) can be set arbitrarily, the device functions as a n:(p−n) redundant structure to cope with the failure of the insertion division device (ADM), and the reliability is high. Recovery operation of a failure in a insertion division device (ADM) is performed by an operation closed in the node, thus the operability is high.

Next, a fourth embodiment having a fourth basic structure of a communication node and a wavelength division multiplexing optical transmission device having a ring structure comprising such communication nodes of the present invention is described.

Figure 10:
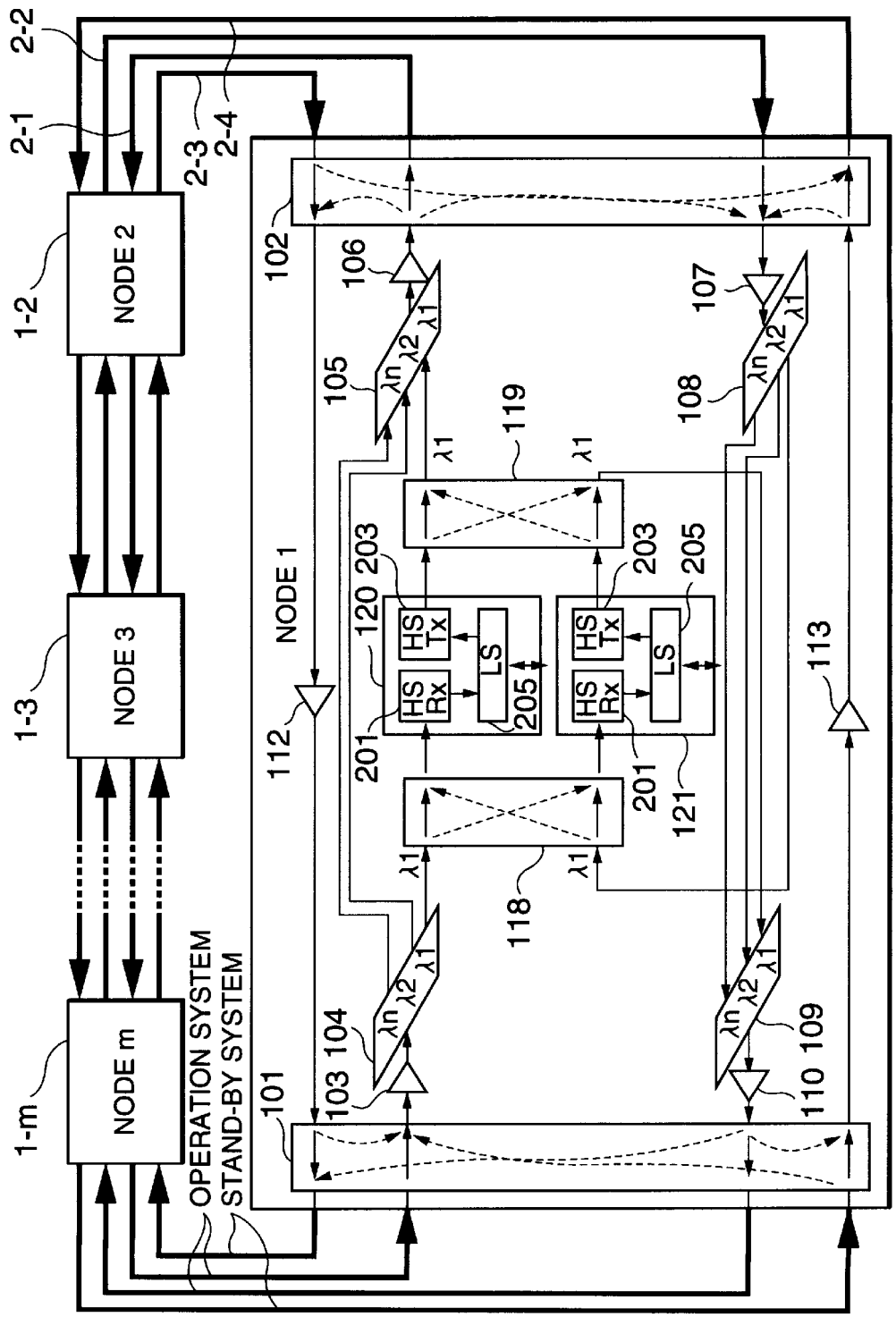
FIG. 10 is a block diagram for illustrating the structure of the fourth embodiment of a wavelength division multiplexing optical transmission device having a ring structure of the present invention.

FIG. 10 is a block diagram for illustrating the structure of the fourth embodiment of a wavelength division multiplexing optical transmission device having a ring structure of the present invention. Components in FIG. 10 having the same numbers as described in FIG. 1 represent the same components shown in FIG. 1. As for other numbers, 118 and 119 represent 2×2 optical switches, and 120 and 121 represent multiplexing terminal devices.

In FIG. 10, only the λ1 is divided/inserted out of optical signal having wavelengths of λ1 to λn outputted from the wavelength division sections 104 and 108, optical signals having other wavelengths are inputted to the wavelength multiplexing sections 105 and 109 and outputted to the transmission line through the optical booster amplifiers 106 and 110 and 4×4 optical switches 101 and 102. Two optical signals having a wavelength of λ1 outputted from the wavelength division sections 104 and 108 are inputted to the 2×2 optical switch and connected selectively to two multiplexing terminal devices 120 and 121. The respective input optical signals are subjected to optical/electric conversion, multiplexing division, and electric/optical conversion in the multiplexing terminals 120 and 121, and an optical signal having a wavelength of λ1 is generated and outputted. The optical signals outputted from the multiplexing terminal devices 120 and 121 are connected selectively to the wavelength multiplexing sections 105 and 109 by the 2×2 optical switch 119.

In the fourth embodiment of the present invention, the communication between nodes is set in a wavelength unit. In detail, for communication performed between the node 1 and node 3, the both node 1 and node 3 are set so as to perform insertion division of the same wavelength.

Operation performed when the transmission line experiences a failure is the same as that described in the first embodiment.

According to the fourth embodiment of the present invention, in addition to the effect of the above-mentioned first embodiment, the wavelength signal that the data signal is not required to be subjected to division/insertion in the node is outputted to the transmission line as it is an optical signal, the 2×2 optical switch performs cross connection operation, and the multiplexing terminal device having no cross connector section is used instead of an insertion division device (ADM). Therefore, an inexpensive system is realized.

Next, a fifth embodiment having a fifth basic structure of an optical communication node and a wavelength division multiplexing optical transmission device having a ring structure comprising such communication nodes of the present invention is described.

Figure 11:
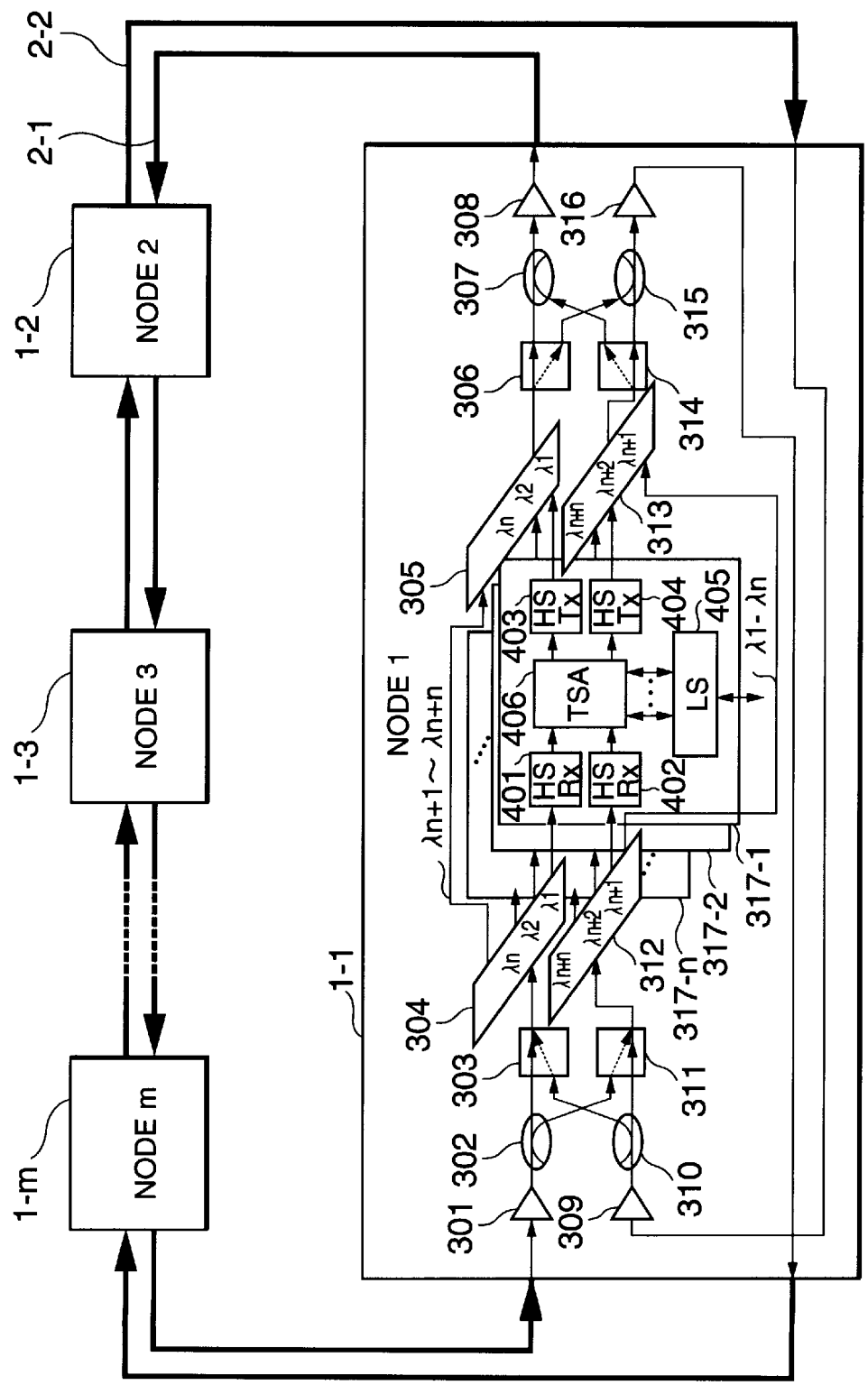
FIG. 11 is a block diagram for illustrating the structure of the fifth embodiment of a wavelength division multiplexing optical transmission device having a ring structure of the present invention.

FIG. 11 is a block diagram for illustrating the structure of the fifth embodiment of a wavelength division multiplexing optical transmission device having a ring structure of the present invention. In FIG. 11, 1-1 to 1-m represent optical insertion division nodes, 2-1 and 2-2 represent transmission line optical fibers (2-1: counter-clockwise, and 2-2:

clockwise), 301 represents a first optical pre-amplifier, 302 represents first optical turnout, 303 represent a first 2×1 optical switch, 304 represents a first wavelength division section, 305 represents a first wavelength multiplexing section, 306 represents a first 1×2 optical switch, 307 represents a first optical coupler, 308 represents a first optical booster amplifier, 309 represents a second optical amplifier, 310 represents a second optical turnout, 311 represents a second 2×1 optical switch, 312 represents a second wavelength division section, 313 represents a second wavelength multiplexing section, 314 represents a second 1×2 optical switch, 315 represents a second optical coupler, 316 represent a second optical booster amplifier, 317-1 to 317-n represent insertion division devices (ADM), 401 and 402 represent high speed signal receiving interface sections, 403 and 404 represent high speed signal transmission interface sections, 405 represents a low speed signal interface section, and 406 represents a cross connector section.

In FIG. 11, m nodes are connected in form of a ring using two bi-directional transmission optical fibers. Each node is operated as described herein under during a working operation, that is, when no failure occurs in the network. In detail, each node transmits a wavelength division multiplexed optical signal having n wavelengths of $\lambda 1$ to $\lambda n$ to the optical fiber transmission line counter-clockwise, and transmits a wavelength division multiplexed optical signal having n wavelengths of $\lambda n+1$ to $\lambda n+n$ to the optical fiber transmission line clockwise. Each node receives a wavelength division multiplexed optical signal having n wavelengths of $\lambda 1$ to $\lambda n$ counter-clockwise, and receives a wavelength division multiplexed optical signal having n wavelengths of $\lambda n+1$ to $\lambda n+n$ clockwise.

The optical signal received from a transmission line optical fiber counter-clockwise is amplified by the optical pre-amplifier 301, and the optical signal received from a transmission line optical fiber clockwise is amplified by the optical pre-amplifier 309. These two optical signals are cross connected by the optical turnouts 302 and 310 and the 2×2 optical switches 303 and 311, then inputted to the wavelength division sections 304 and 312. The wavelength division section 312 separates the input optical signal into n wavelength components having wavelengths from $\lambda n+1$ to $\lambda n+n$. The wavelength divided optical signals having n wavelengths from $\lambda 1$ to $\lambda n$ and the wavelength divided optical signals having n wavelengths from $\lambda n+1$ to $\lambda n+n$ are inputted to ADM devices 317 to 317-n, respectively. In detail, the optical signals having a wavelength of $\lambda 1$ and having a wavelength of $\lambda n+1$ are inputted to the ADM device 317-1, the optical signals having a wavelength of $\lambda 2$ and having a wavelength of $\lambda n+2$ are inputted to the ADM device 317-2, and the optical signals having a wavelength of $\lambda n$ and having a wavelength of $\lambda n+n$ are inputted to the ADM device 317-n.

The respective ADM devices 317-1 to 317-n output optical signals having wavelengths from $\lambda 1$ to $\lambda n$ and having wavelengths from $\lambda n+1$ to $\lambda n+n$. In detail, the ADM device 317-1 outputs optical signals having wavelengths of $\lambda 1$ and $\lambda n+1$, the ADM device 317-2 outputs optical signals having wavelengths of $\lambda 2$ and $\lambda n+2$, and the ADM device 317-n outputs optical signals having wavelengths of $\lambda n$ and $\lambda n+n$. n optical signals having wavelengths from $\lambda 1$ to $\lambda n$ out of the signals outputted from the respective ADM devices 317-1 to 317-n are subjected to wavelength division multiplexing operation in the wavelength multiplexing section 305, and n optical signals having wavelengths from $\lambda n+1$ to $\lambda n+n$ out of the signals outputted from the respective ADM devices 317-1 to 317-n are subjected to wavelength division multiplexing operation in the wavelength multiplexing section 314. The 1×2 optical switch 306 selects any one of the optical couplers 307 and 315 and the optical signal outputted from the wavelength multiplexing section 305 is outputted from the selected optical coupler, and the 1×2 optical switch 314 selects any one of optical couplers 307 and 315 and the optical signal outputted from the wavelength multiplexing section 314 is outputted from the selected optical coupler. The optical signal coupled by the optical coupler 307 is amplified by the optical booster amplifier 308, and then outputted to the transmission line counter-clockwise. On the other hand, the optical signal coupled by the optical coupler 315 is amplified by the optical booster amplifier 316, and then outputted to the transmission line clockwise.

Next, recovery operation performed when the transmission line experiences a failure in the fifth embodiment of the present invention shown in FIG. 11 is described with reference to FIG. 12.

Figure 12:
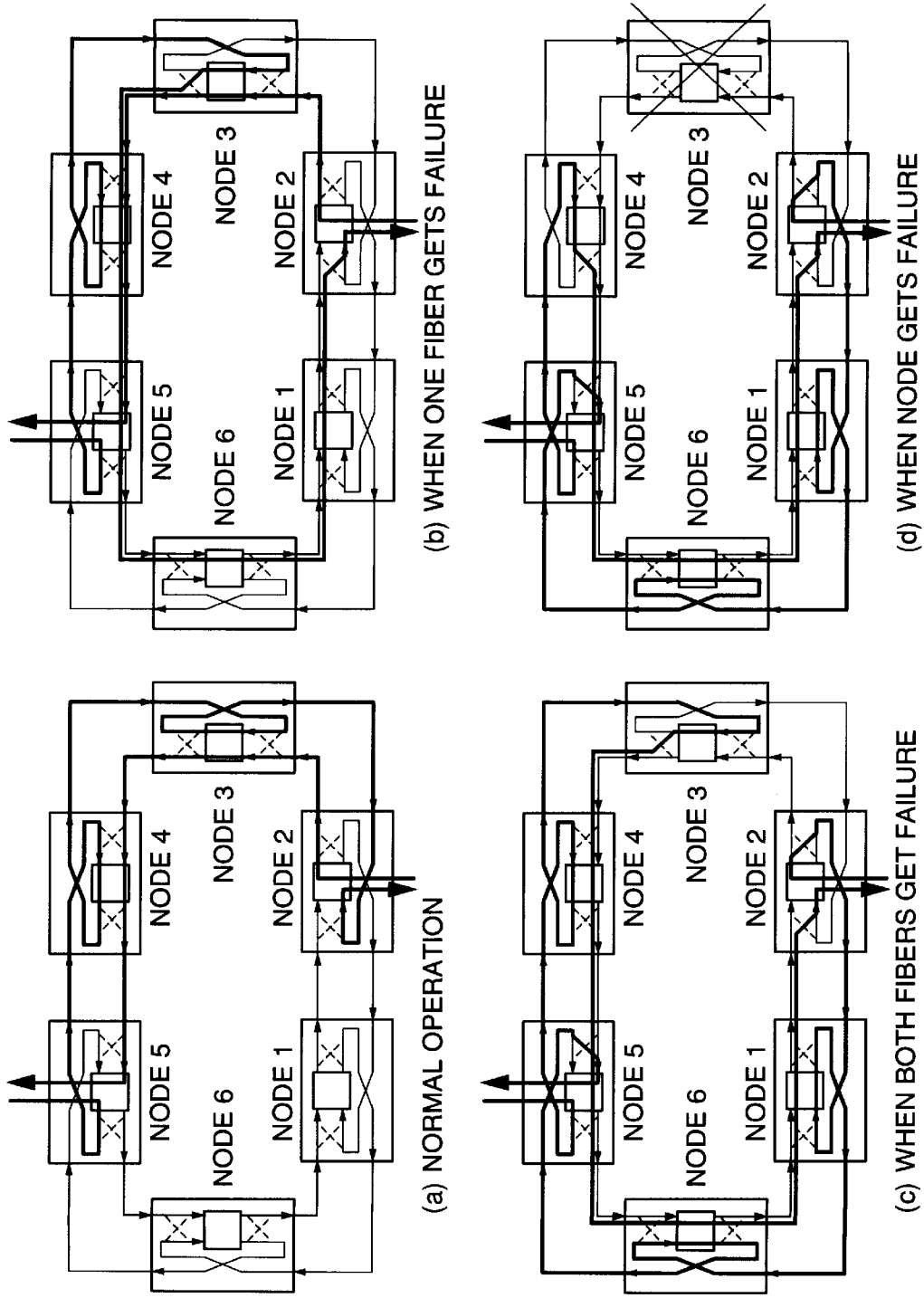
FIG. 12 is a set of diagrams for illustrating recovery operation from failure in the fifth embodiment of the wavelength division multiplexing optical transmission device having a ring structure of the present invention.

In FIG. 12(*a*) during working (or normal) operation, the data signal is two-way communicated between the node 2 and node 5 through the transmission lines. In the node 2 and node 5, the data signal is inputted and outputted from the low speed signal interface section in the node, and the cross connector section set the path.

Figure 2:
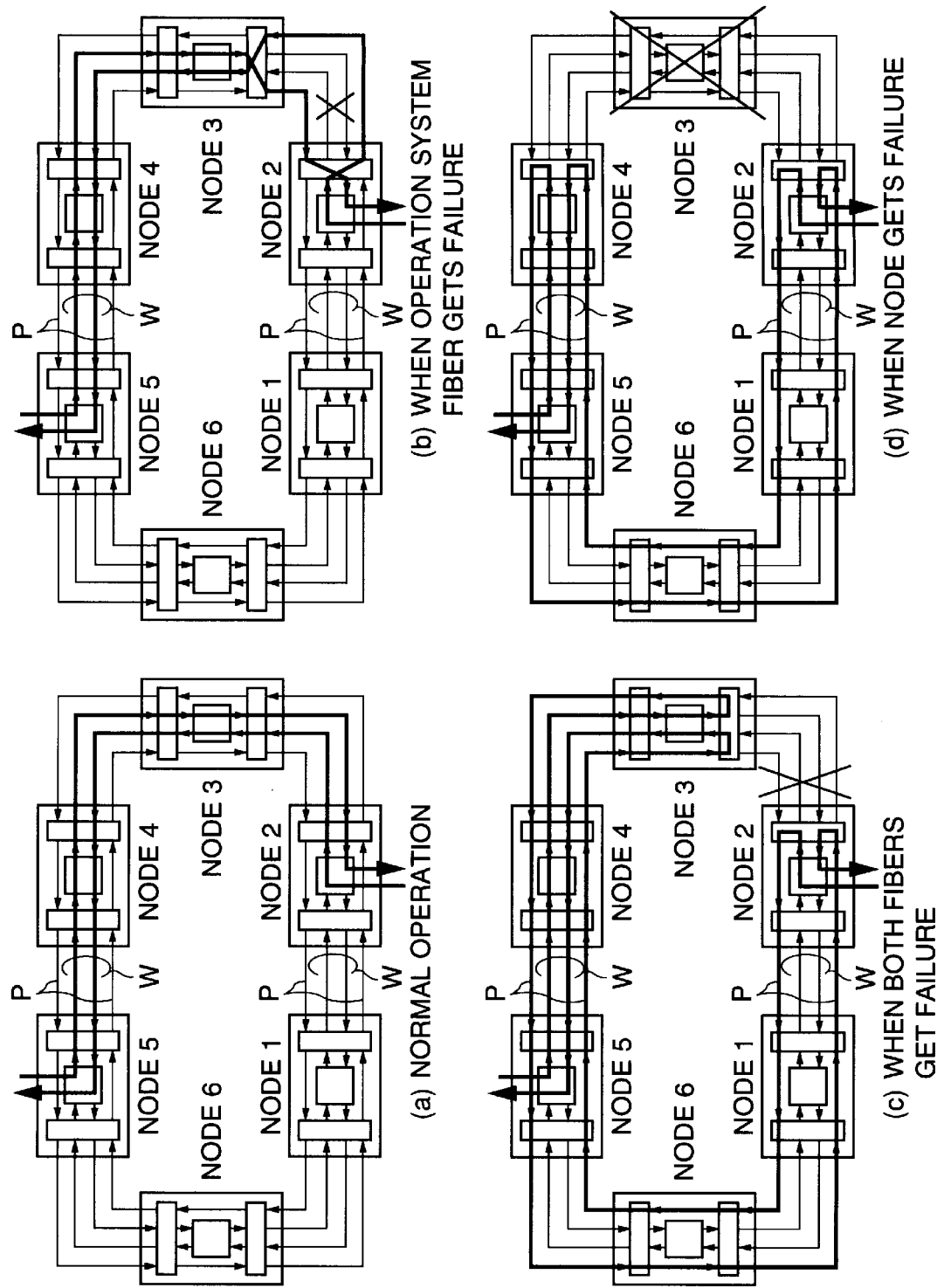
FIG. 2 is a set of diagrams for illustrating recovery operation from a failure in the first embodiment of the wavelength division multiplexing optical transmission device having a ring structure of the present invention.

Operation performed when the clockwise transmission line is disconnected between the node 2 and node 3 is described in FIG. 2(*b*). In this case, the 1×2 optical switch 314 of the node 3 changes the path from the connection that allows the optical signal to be outputted to the clockwise transmission line side between the node 2 and node 3, to the connection that allows the optical signal to be outputted counter-clockwise to the transmission line side between the node 3 and node 4. The 2×1 optical switch 311 of the node 2 changes the path from the connection that allows the optical signal to be inputted clockwise from the transmission line side between the node 2 and node 3, to the connection which allows the optical signal to be inputted counter-clockwise from the transmission side between the node 1 and node 2. Thereby, the communication of the data signal is secured by by-passing a disconnected transmission line.

Operation performed when the both clockwise and counter-clockwise transmission lines are disconnected between the node 2 and node 3 is shown in FIG. 12(*c*). In this case, in addition to the operation performed in FIG. 12(*b*), in the node 2, the 1×2 optical switch 306 of the node 2 changes the path from the connection that allows the optical signal to be outputted counter-clockwise to the transmission line side between the node 2 and node 3, to the connection that allows the optical signal to be outputted clockwise to the transmission line side between the node 1 and node 2. In the node 5, the 1×2 optical switch 303 of the node 5 changes the path from the connection that allows the optical signal to be inputted counter-clockwise from the transmission side between the node 5 and node 4, to the connection that allows the optical signal to be inputted clockwise from the transmission line side between the node 5 and node 6. Thereby, the communication of the data signal is secured by by-passing the disconnected transmission line.

The operation that is performed when the node 3 experiences a failure is described in FIG. 12(*d*). In this case, the 1×2 optical switch 314 of the node 4 changes the path from the connection that allows the optical signal to be outputted clockwise to the transmission line side between the node 4 and node 3 to the connection that allows the optical signal to be outputted counter-clockwise to the transmission side between the node 4 and node 5. The 2×1 optical switch 311 of the node 2 changes the path from the connection that allows the optical signal is to be inputted clockwise from the transmission line side of the node 2 and node 3 to the connection that allows the optical signal to be inputted counter-clockwise from the transmission side between the node 1 and node 2. Also, the 1×2 optical switch 311 changes the path from the connection that allows the optical signal to be outputted counter-clockwise to the transmission line side between the node 2 and node 3 to the connection that allows the optical signal is to be outputted clockwise to the transmission line side between the node 1 and node 2. Further, the 1×2 optical switch 303 of the node 5 changes the path from the connection that allows the optical signal is to be inputted counter-clockwise from the transmission line side between the node 5 and node 4, to the connection which allows the optical signal is to be inputted clockwise from the transmission line side between the node 5 and node 6. Thereby, the communication of the data signal is secured by by-passing the disconnected transmission lines.

According to the fifth embodiment of the present invention, only the two high speed signal transmission receiving interface sections are used in a insertion division device (ADM) in each node. Thereby, an inexpensive and small-sized device can be realized in comparison with the first conventional art. Wavelength channels transmitted during working operation are set separately for the clockwise transmission line and counter-clockwise transmission line, and the path is by-passed to the other transmission line each other. Therefore, only two transmission fibers are sufficient for use, and this system is excellent in economy as the whole network.

Next, a sixth embodiment having a sixth structure of an optical communication node and a wavelength division multiplexing optical transmission device having a ring structure comprising such optical communication nodes is described.

Figure 13:
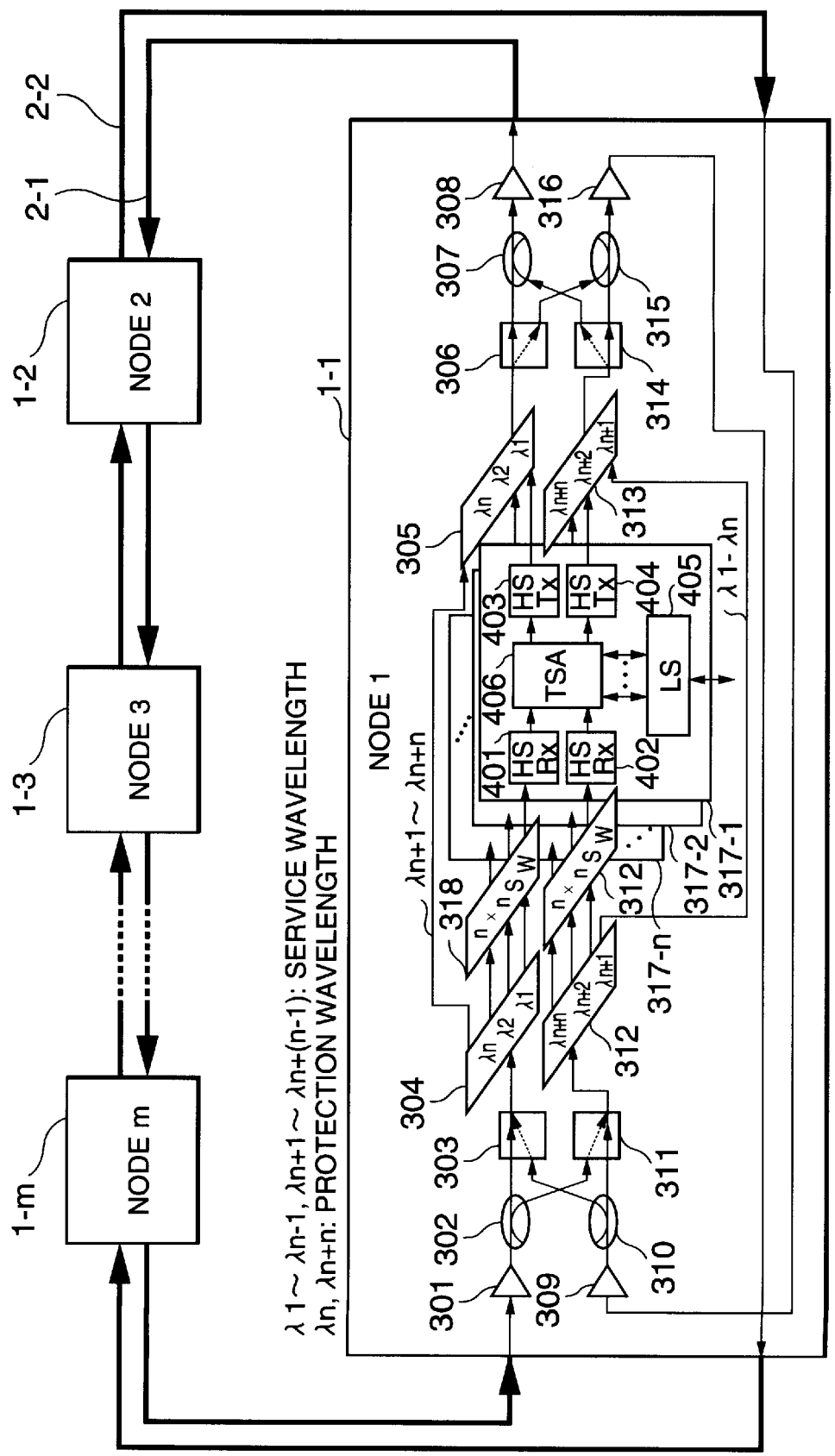
FIG. 13 is a block diagram for illustrating the structure of the sixth embodiment of a wavelength division multiplexing optical transmission device having a ring structure of the present invention.

FIG. 13 a block diagram for illustrating the structure of the sixth embodiment of a wavelength division multiplexing optical transmission device having a ring structure of the present invention. In FIG. 13, components having the same numbers shown in FIG. 11 are the same components as described in FIG. 11. As for other numbers, 318 and 319 represent n×n optical switches.

In FIG. 13, the n×n optical switches 318 and 319 for connecting selectively optical signals having wavelengths from $\lambda 1$ to $\lambda n$ and having wavelengths from $\lambda n+1$ to $\lambda n+n$ are provided respectively subsequent to the wavelength division sections 304 and 312. The n×n optical switch inputs the optical signal received from the transmission line to an arbitrary insertion division device and changes the path of the signal. In FIG. 13, $\lambda 1$ to $\lambda n-1$ and $\lambda n+1$ to $\lambda n+(n-1)$ are set as service wavelength and $\lambda n$ and $\lambda n+n$ are set as protection wavelength. When any one of insertion division devices 317-1 to 317-(n−1) experiences a failure, the path is switched to the path passing via the insertion division device 317-n.

The operation that is performed when an insertion division device experiences a failure is the same as that described in the second embodiment with reference to FIG. 7.

Other operations are the same as those described in the fifth embodiment of the present invention.

According to the sixth embodiment of the present invention, in addition to the effect of the above-mentioned fifth embodiment, because the n×n optical switches for selecting arbitrarily the wavelength channel to be inputted to the insertion division device are provided, and the device can cope with insertion division device (ADM) failure with aid of protection wavelength, thus the reliability is high.

Next, a seventh embodiment having a seventh basic structure of an optical communication node and a wavelength division multiplexing optical transmission device having a ring structure comprising such communication nodes of the present invention is described.

Figure 14:
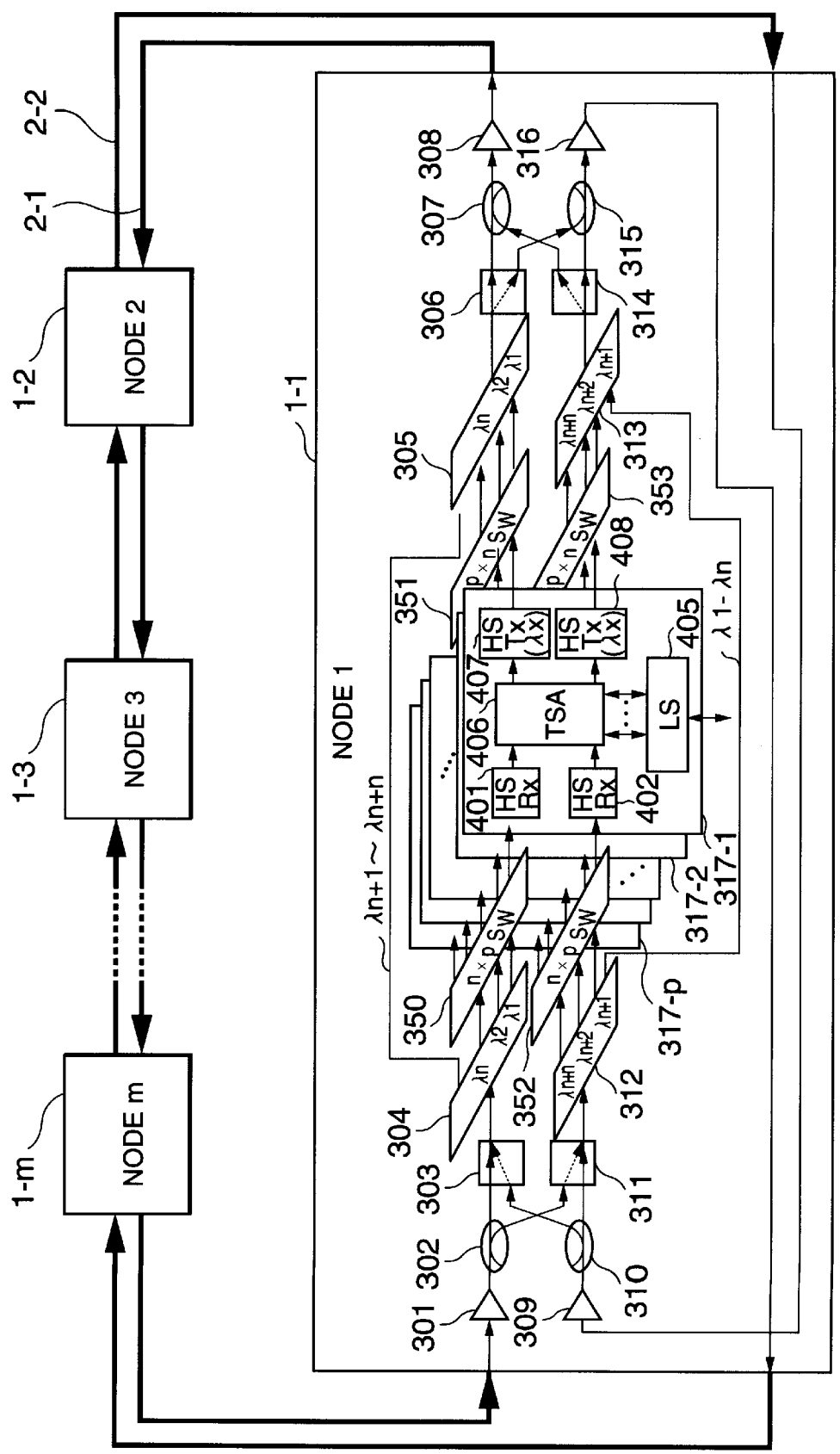
FIG. 14 is a block diagram for illustrating the structure of the seventh embodiment of a wavelength division multiplexing optical transmission device having a ring structure of the present invention.

FIG. 14 is a block diagram for illustrating the structure of the seventh embodiment of a wavelength division multiplexing optical transmission device having a ring structure of the present invention. Components in FIG. 14 having the same numbers as described in FIG. 11 represent the same components shown in FIG. 11. As for other numbers, 350 and 352 represent n×p optical switches, 361 and 353 represent p×n optical switches, and 407 and 408 represent high speed signal interface having transmission wavelength setting function.

In FIG. 14, n×p optical switches 150 and 152 for connecting selectively optical signals having wavelengths from $\lambda 1$ to $\lambda n$ and having wavelengths from $\lambda n+1$ to $\lambda n+n$ to the subsequent p insertion division devices 317-1 to 317-p are provided subsequently to the wavelength division sections 304 and 312.

Further, p×n optical switches 315 and 353 for connecting selectively optical signals having wavelengths from $\lambda 1$ to $\lambda n$ and having wavelengths from $\lambda n+1$ to $\lambda n+n$ that are outputted from the insertion division devices to the wavelength multiplexing sections 305 and 313 are provided subsequently to the p (p×n) insertion division devices 317-1 to 317-p, and the high speed signal transmission interfaces in insertion division devices select arbitrarily the wavelength to be transmitted in the range from $\lambda 1$ to $\lambda n$ or in the range from $\lambda n+1$ to $\lambda n+n$. These n×p and p×n optical switches serve to connect the wavelength to be set and outputted by the insertion division device to the prescribed wavelength ports of the wavelength multiplexing sections 305 and 313.

The operation that is performed when the insertion division device experiences a failure is the same as that described in the third embodiment of the present invention with reference to FIG. 9.

Other operations are the same as those described in the fifth embodiment of the present invention.

According to the seventh embodiment of the present invention, in addition to the effect of the above-mentioned seventh embodiment, because the respective wavelength signals received from the transmission line is inputted to an arbitrary insertion division device and the wavelength to be outputted from the respective insertion division devices (ADM) are set arbitrarily, and the n:(p−n) redundant structure is provided to cope with insertion division device (ADM) failure. Thus, the reliability is high. The recovery operation for coping with insertion division device (ADM) failure is performed by the operation closed in the failure node. Therefore, the operability is high.

Next, an eighth embodiment having an eighth basic structure of an optical node and a wavelength division multiplexing optical transmission device having a ring structure comprising such optical communication nodes of the present invention is described.

Figure 15:
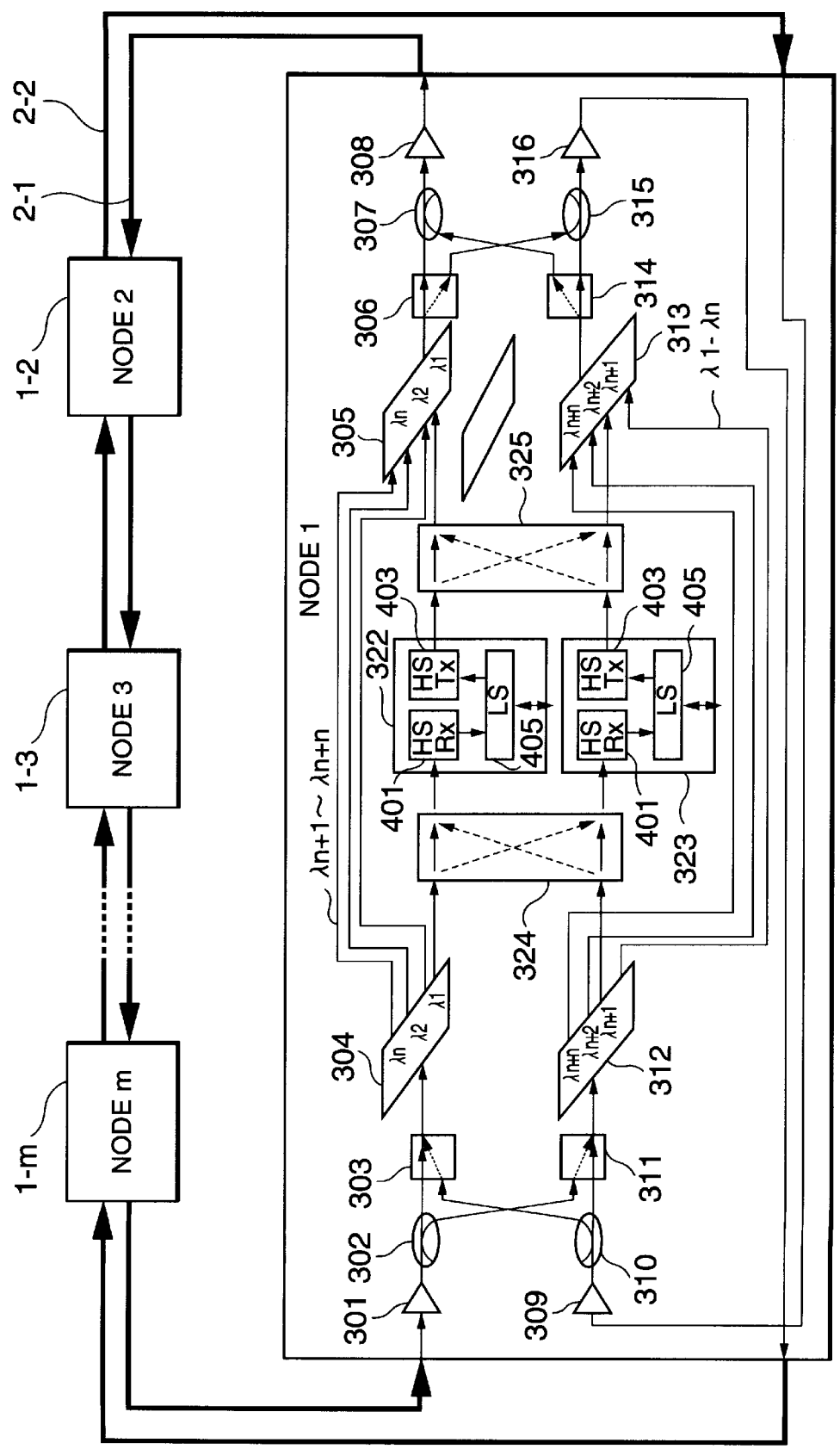
FIG. 15 is a block diagram for illustrating the structure of the eighth embodiment of a wavelength division multiplexing optical transmission device having a ring structure of the present invention.
Figure 16:
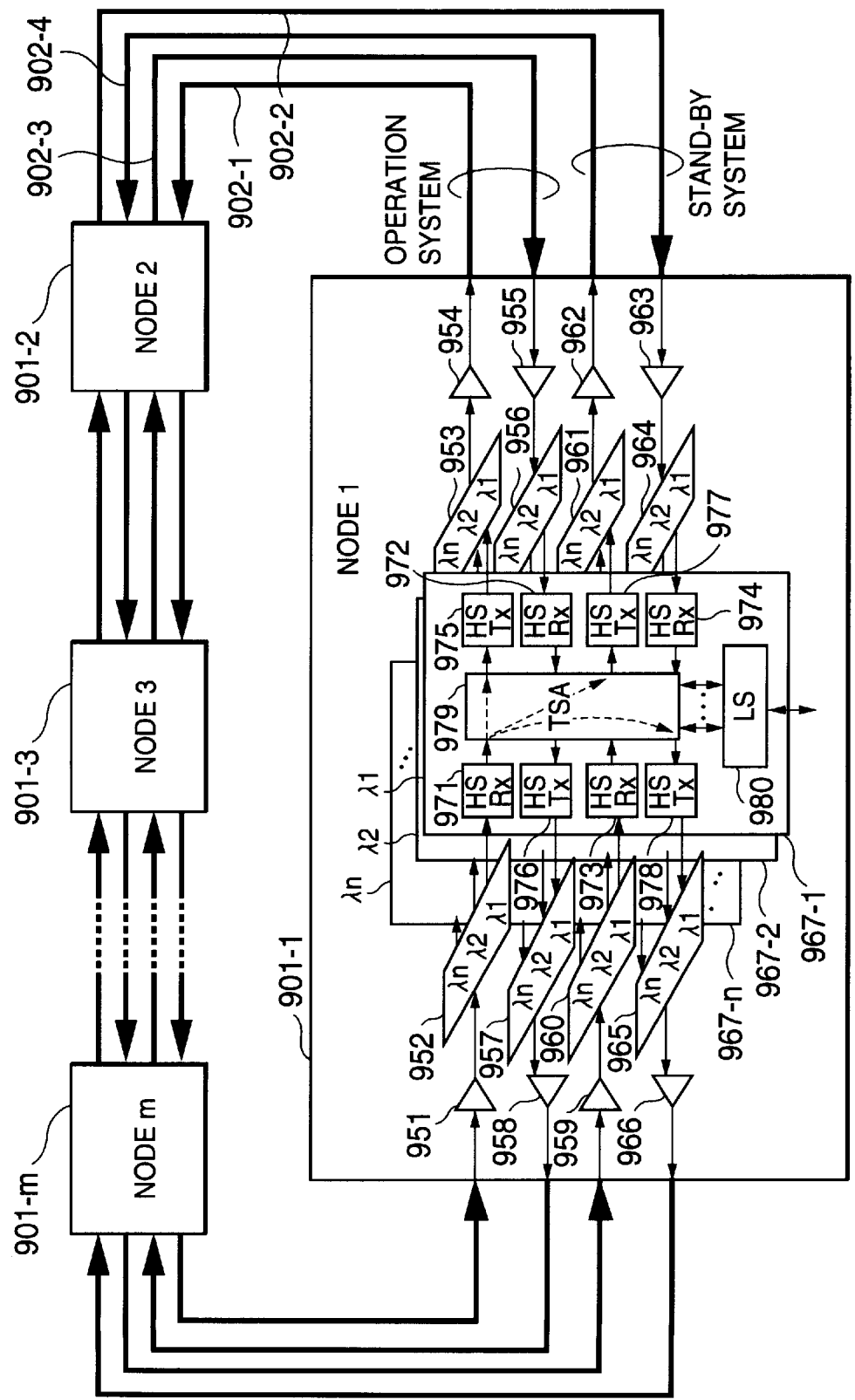
FIG. 16 is a block diagram for illustrating the structure of an optical transmission device according to the first conventional art.
Figure 17:
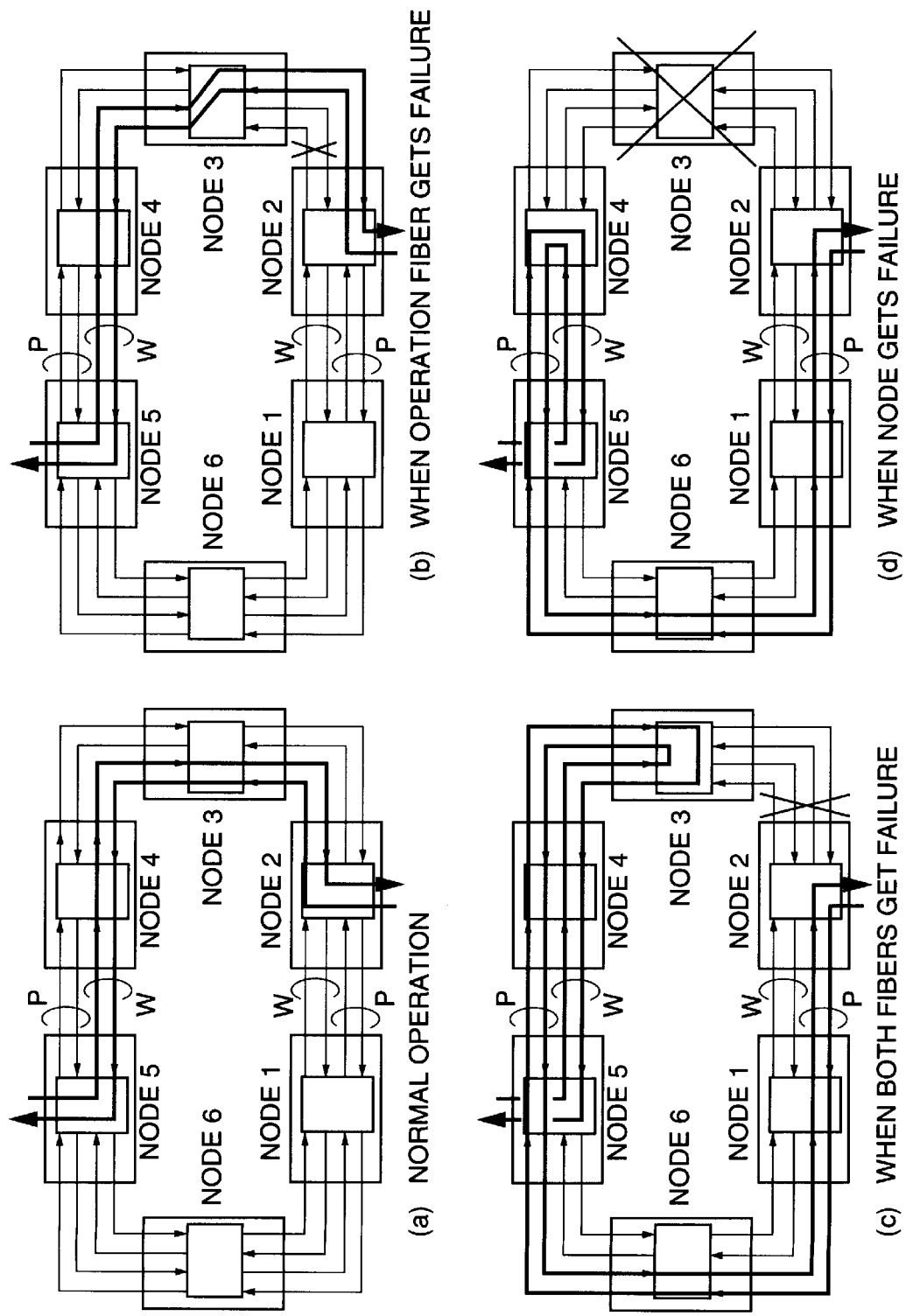
FIG. 17 is a set of diagrams for illustrating recovery operation from failure in the optical transmission device of the first conventional art.
Figure 18:
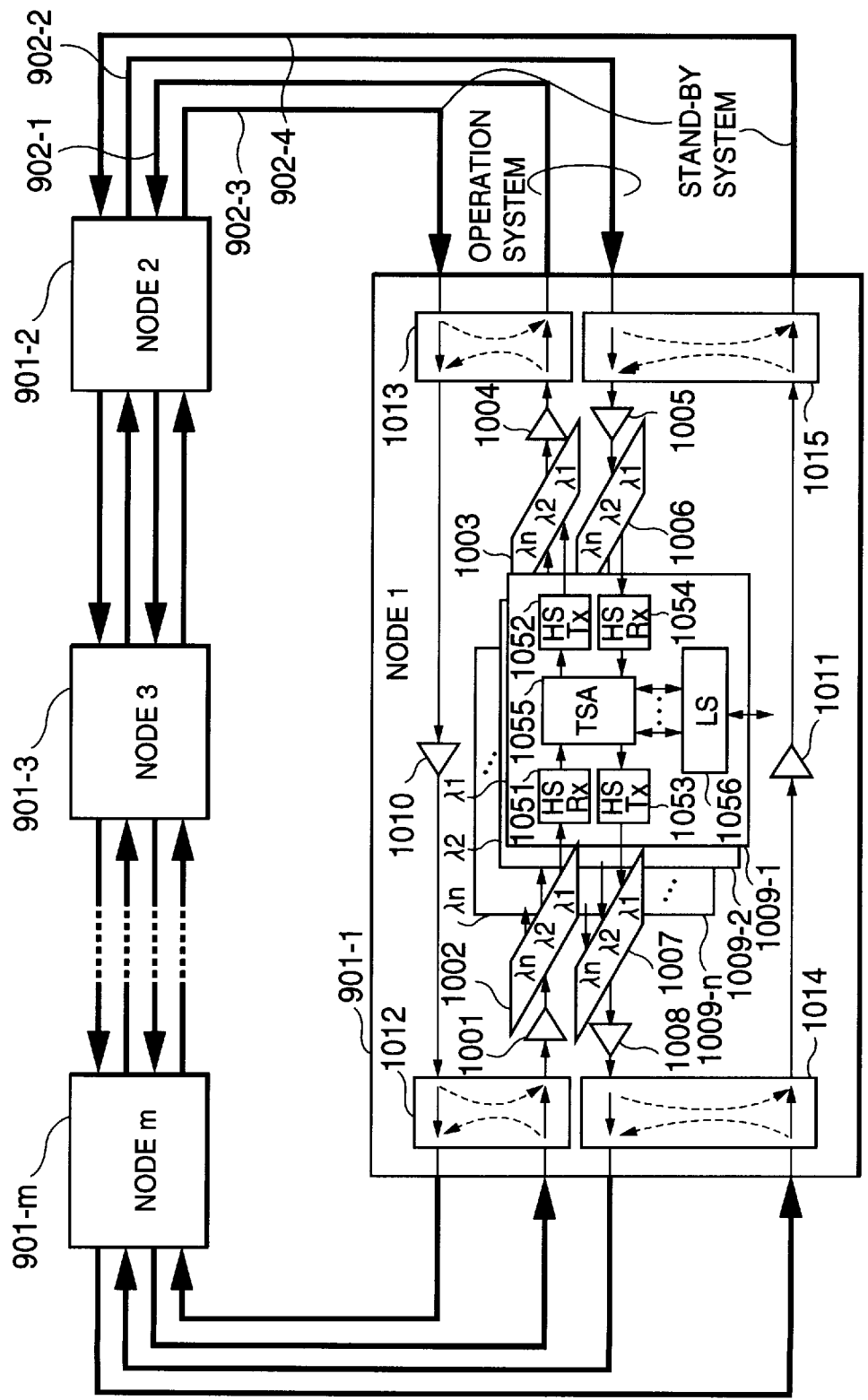
FIG. 18 is a block diagram for illustrating the structure of an optical transmission device according to the second conventional art.
Figure 19:
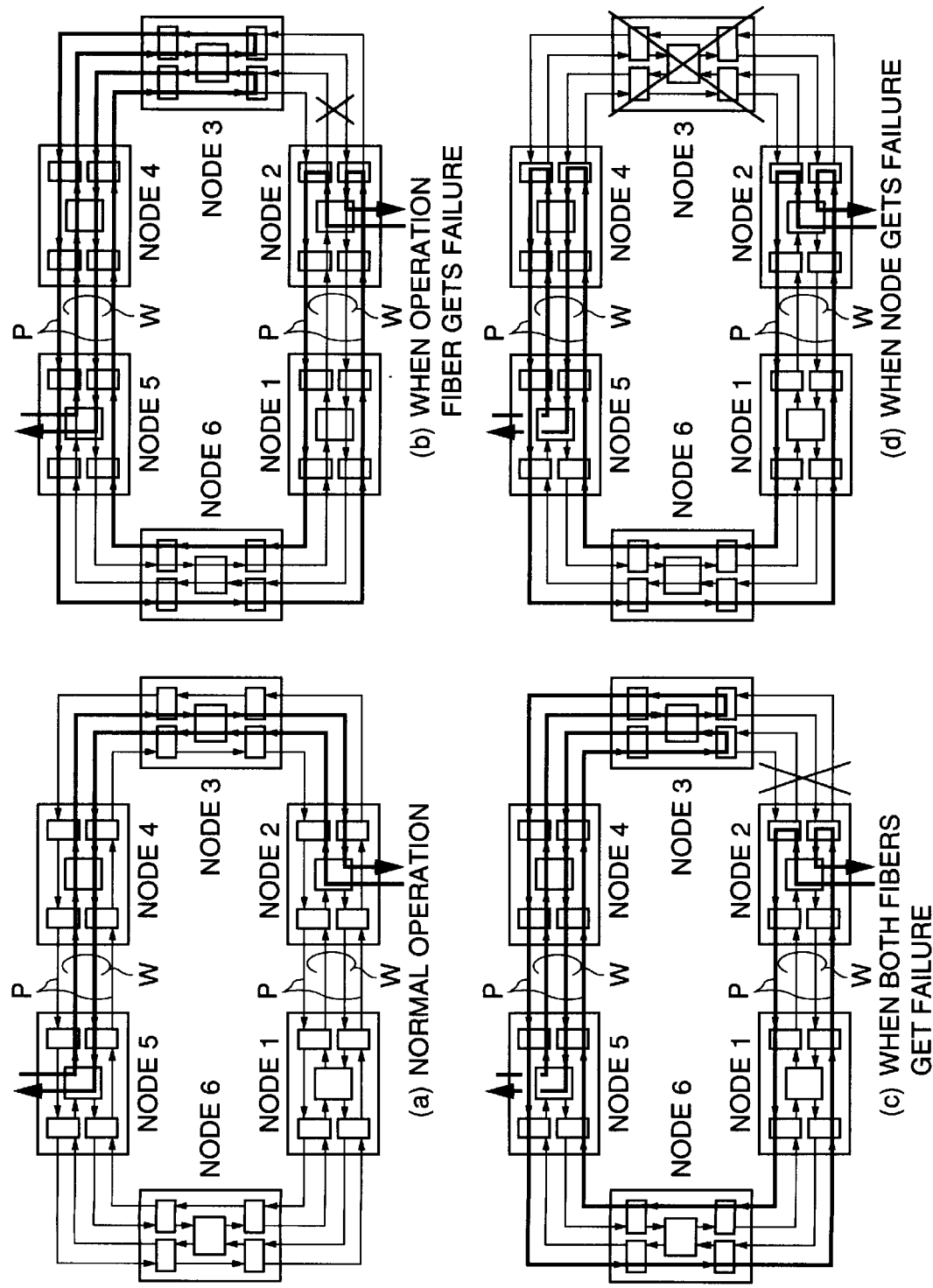
FIG. 19 is a set of diagrams for illustrating recovery operation from failure in the optical transmission device of the second conventional art.

FIG. 15 is a block diagram for illustrating the structure of the eighth embodiment of the wavelength division multiplexing optical transmission device having a ring structure of the present invention. Components in FIG. 15 having the same numbers as described in FIG. 11 represent the same components shown in FIG. 11. As for other numbers, 324 and 325 represent 2×2 optical switches and 322 and 323 represent multiplexing terminal devices.

Only λ1 and λn+1 out of optical signals having wavelengths from λ1 to λn and having wavelengths from λn+1 to λn+n outputted from the wavelength division sections 304 and 312 are subjected to division/insertion. Other wavelengths are inputted to the wavelength multiplexing sections 305 and 313 as it is, and subsequently outputted to the transmission line through the 1×2 optical switches 306 and 314, optical couplers 307 and 315 and optical booster amplifiers 308 and 316. Two optical signals having wavelengths of λ1 and λn+1 outputted from the wavelength division sections 304 and 308 are inputted to the 2×2 optical switch 324 and connected selectively to two multiplexing terminal devices 322 and 323. In the multiplexing terminal devices 322 and 323, the respective input optical signals are subjected to optical/electric conversion, multiplexing division, and electric/optical conversion, and optical signals having wavelengths of λ1 and λn+1 are generated and outputted. The optical signals outputted from the multiplexing terminal devices 322 and 323 are connected selectively to the wavelength multiplexing sections 305 and 313 by the 2×2 optical switch 325.

In the eighth embodiment, the communication between nodes is set in wavelength unit. In detail, both node 1 and node 3 are set so as to perform insertion division operation of the same wavelength for communication between the node 1 and node 3.

The operation that is performed when the transmission line experiences a failure is the same operation as that described in the fifth embodiment shown in FIG. 12.

According to the eighth embodiment of the present invention, in addition to the effect of the above-mentioned fifth embodiment, because wavelength signals that do not need division/insertion operation of the data signal in the node are outputted as it is optical signal, and subjected to cross connector operation by the 2×2 optical switch, and the multiplexing terminal devices having no cross connector section is used instead of the insertion division device (ADM). Thus, a more inexpensive system can be realized.

As described herein before, because, according to the optical communication node and the wavelength division multiplexing optical transmission device having a ring structure comprising such optical communication nodes of the present invention, only two high speed signal transmission reception interface sections are used in a insertion division device (ADM) in each node. Thus, an inexpensive and small-sized product can be realized in comparison with the first conventional art. Further, because recovery from a failure is operated with aid of 4×4 optical switches in the first embodiment, and more by-passes for by-passing failures are available than in the second conventional art, the present invention provides a highly reliable system.

n×n optical switches for selecting arbitrarily wavelength channel to be inputted to insertion division devices (ADM) are provided, because failure of an insertion division device (ADM) can be recovered by providing a protection wavelength. Thus, the present invention provides a highly reliable system.

Because respective wavelength signals received from the transmission line is inputted to arbitrary insertion division devices (ADM), the wavelength to be outputted from each insertion division device (ADM) can be set arbitrarily, and the n:(p−n) redundant structure is afforded to cope with insertion division device (ADM) failure, and thus the present invention provides a highly reliable system. Because recovery operation from insertion division device (ADM) failure is performed by the operation closed in the failure node, the present invention provides high operability.

Because wavelength signals that the data signal is not needed to be subjected to division/insertion operation in the node is outputted to the transmission line as it is optical signal, cross connector operation is performed by aid of 2×2 optical switches, and multiplexing terminal devices having no cross connector section are used instead of a insertion division device (ADM). Thus, the present invention leads to inexpensive systems.

Because only two high speed signal transmission reception interface sections are used in a insertion division device (ADM), the present invention leads to very inexpensive and small-sized products in comparison with the first conventional art. Because the wavelength channel transmitted during working operation is set separately to the clockwise transmission line and counter-clockwise transmission line, the path can be by-passed to the other transmission line during failure, and two transmission line fibers are sufficient for communication. Thus, the present invention leads to economical network as a whole. Because n×n optical switches for selecting arbitrarily wavelength channel to be inputted to insertion division devices (ADM) are provided, and also failure of an insertion division device (ADM) can be recovered by providing a protection wavelength. Thus, the present invention provides a highly reliable system.

Further, because respective wavelength signals received from the transmission line is inputted to arbitrary insertion division devices (ADM), the wavelength to be outputted from each insertion division device (ADM) can be set arbitrarily, and the n:(p−n) redundant structure is afforded to cope with insertion division device (ADM) failure. Thus, the present invention provides a highly reliable system. Because recovery operation from insertion division device (ADM) failure is performed by the operation closed in the failure node, the present invention provides high operability.

Further, because wavelength signals that the data signal is not needed to be subjected to division/insertion operation in the node is outputted to the transmission line as it is optical signal, cross connector operation is performed by aid of 2×2 optical switches, and multiplexing terminal devices having no cross connector section are used instead of a insertion division device (ADM), thus the present invention leads to inexpensive systems.

While embodiments have been described herein, modification of the described embodiments may become apparent to those of ordinary skill in the art, following the teachings of the invention, without departing from the scope of the invention as set forth in the appended claims.

What is claimed is:

1. An optical node comprising:
   a clockwise primary optical transmission line input terminal and a clockwise primary optical transmission line output terminal,
   a counter-clockwise primary optical transmission line input terminal and a counter-clockwise primary optical transmission line output terminal,
   a clockwise stand-by optical transmission line input terminal and a clockwise stand-by optical transmission line output terminal,
   a counter-clockwise stand-by optical transmission line input terminal and a counter-clockwise stand-by optical transmission line output terminal,
   a first terminal section including a first reception unit that converts a first reception optical signal inputted from one of the clockwise primary optical transmission line input terminal, the counter-clockwise primary optical transmission line input terminal, the clockwise stand-by optical transmission line input terminal, and the counter-clockwise stand-by optical transmission line input terminal, to a first electrical signal, and a first transmission unit that converts the first electrical signal to a first optical signal, and that outputs the first optical signal through one of the clockwise primary optical transmission line output terminal, the counter-clockwise primary optical transmission line output terminal, the clockwise stand-by optical transmission line output terminal, and the counter-clockwise stand-by optical transmission line output terminal, a second terminal section including a second reception unit that converts a second reception optical signal inputted from one of the clockwise primary optical transmission line input terminal, the counter-clockwise primary optical transmission line input terminal, the clockwise stand-by optical transmission line input terminal, and the counter-clockwise stand-by optical transmission line input terminal, to a second electrical signal, and a second transmission unit that converts the second electrical signal to a second optical signal, and that outputs the second optical signal through one of the clockwise primary optical transmission line output terminal, the counter-clockwise primary optical transmission line output terminal, the clockwise stand-by optical transmission line output terminal, and the counter-clockwise stand-by optical transmission line output terminal, a first stand-by path and second stand-by path each having an input terminal and an output terminal, a first optical path switching unit having first through fourth input ports and first through fourth output ports, the first optical path switching unit configured to switch a path of the first reception optical signal received on any one of the first through fourth input ports to any one of the first through fourth output ports, the first input Port being connected to the output terminal of the first stand-by path, the second input port being connected to the clockwise primary optical transmission line input terminal, the third input port being connected to an output terminal of the second terminal section, the fourth input port being connected to the counter-clockwise stand-by optical transmission line input terminal, the first output port being connected to the clockwise stand-by optical transmission line output terminal, the second output port being connected to an input terminal of the first terminal section, the third output port being connected to the clockwise primary optical transmission line output terminal, and the fourth output port being connected to the input terminal of the second stand-by path, a second optical path switching unit having first through fourth input ports and first through fourth output ports, the second optical path switching unit configured to switch a Path of the second reception optical signal received on any one of the first through fourth input ports of the second optical path switching unit to any one of said first through fourth output ports of the second optical path switching unit, the first input port of the second optical path switching unit being connected to the clockwise stand-by optical transmission line input terminal, the second input port of the second optical path switching unit being connected to an output terminal of the first terminal section, the third input port of the second optical path switching unit being connected to the clockwise primary optical transmission line input terminal, and the fourth input port of the second optical path switching unit being connected to the output terminal of the second stand-by path, the first output port of the second optical path switching unit being connected to the input terminal of the first stand-by path, the second output port of the second optical path switching unit being connected to the counter-clockwise primary optical transmission line output terminal, the third output port of the second optical path switching unit being connected to an input terminal of the second terminal section, and the fourth output port of the second optical path switching unit being connected to the counter-clockwise stand-by optical transmission line output terminal.

2. The optical communication node as claimed in claim 1, wherein:

the first stand-by path includes a first junction optical amplifier provided between the input terminal and output terminal of the first stand-by path, for amplifying the input optical signal and for outputting a first junction amplification optical signal, and the second stand-by path includes a second junction optical amplifier provided between the input terminal and output terminal of the second stand-by path, for amplifying the input optical signal and for outputting a second junction amplification optical signal.

3. The optical communication node as claimed in claim 1, wherein each node further comprises:

a first optical pre-amplifier provided between the first optical path switching unit and the first reception unit, for optically amplifying the first reception optical signal and outputting the amplified first reception optical signal to the first reception unit, and a second optical pre-amplifier provided between the second optical switching unit and the second reception unit, for optically amplifying the second reception optical signal and outputting the second reception optical signal to the second reception unit.

4. The optical communication node as claimed in claim 1, wherein each node further comprises:

a first booster optical amplifier provided between the first optical path switching unit and the second transmission unit, for optically amplifying the first transmission optical signal and outputting the amplified first transmission optical signal to the second optical path switching unit, and a second booster optical amplifier provided between the second optical path switching unit and the first transmission unit, for optically amplifying the first transmission optical signal and outputting the amplified first transmission optical signal to the first optical path switching unit.

5. The optical communication node as claimed in claim 1, wherein the first terminal section and the second terminal section respectively comprise:

a first reception interface section and second reception interface section for performing an overhead termination and division operation on the first reception optical signal and the second reception optical signal, respectively, and a first transmission interface section and second transmission interface section for performing time-division multiplexing on the first and second electrical signals, respectively, to perform an overhead signal insertion, and for generating and outputting an optical signal having a same wavelength as the optical signal inputted to the first and second reception interface sections, respectively.

6. The optical communication node as claimed in claim 5, wherein the first terminal section and the second terminal section each comprise:

a low speed signal interface section for partially transmitting/receiving a data signal inputted/outputted through the first transmission interface section and the first reception interface section, and the second transmission interface section and the second reception interface section, and a cross connector section for connecting selectively two pairs of electric data signals inputted from the first reception interface section and the second reception interface section and two pairs of electric data signals outputted to the first transmission interface section and the second transmission interface section depending on an existence of a failure condition of the optical transmission line or the node, and for partially separating or inserting the data signal inputted/outputted through the first transmission interface section and the first reception interface section, and the second transmission interface section and the second reception interface section, and for inputting to the low speed signal interface section.

7. The optical communication node as claimed claim 1, further comprising a first wavelength division unit and a second wavelength division unit, each including an arrayed-waveguide grating.

8. The optical communication node as claimed claim 1, further comprising a first wavelength division unit and a second wavelength division unit, each including an arrayed-waveguide grating.

9. The optical communication node as claimed in claim 2, wherein the first junction optical amplifier and the second junction amplifier are each provided with an optical fiber amplifier.

10. The optical communication node as claimed in claim 2, wherein the first junction optical amplifier and the second junction optical amplifier are each provided with a semiconductor optical amplifier.

11. The optical communication node as claimed in claim 3, wherein the first optical pre-amplifier and the second optical pre-amplifier are each provided with an optical fiber amplifier.

12. The optical communication node as claimed in claim 3, wherein the first optical pre-amplifier and the second optical pre-amplifier are each provided with a semiconductor optical amplifier.

13. The optical communication node as claimed in claim 4, wherein the first booster optical amplifier and the second booster optical amplifier are each provided with an optical fiber amplifier.

14. The optical communication node as claimed in claim 4, wherein the first booster optical amplifier and the second optical pre-amplifier are each provided with a semiconductor optical amplifier.

15. The optical communication node as claimed in claim 1, wherein, between said optical node and an adjacent optical node, the clockwise primary optical transmission line connects the clockwise primary optical transmission line input terminal of the optical node and the clockwise primary optical transmission line output terminal of the adjacent optical node, the counter-clockwise primary optical transmission line connects the counter-clockwise primary optical transmission line input terminal of the optical node and the counter-clockwise primary optical transmission line output terminal of the adjacent optical node, the clockwise stand-by optical transmission line connects the clockwise stand-by optical transmission line input terminal of the optical node and the clockwise stand-by optical transmission line output terminal of the adjacent optical node, and the counter-clockwise stand-by optical transmission line connects the counter-clockwise stand-by optical transmission line input terminal of the optical node and the counter-clockwise stand-by optical transmission line output terminal of the adjacent optical node, to thereby form a ring connection.

16. An optical communication node comprising:

a clockwise primary optical transmission line input terminal and a clockwise primary optical transmission output terminal, a counter-clockwise primary optical transmission line input terminal and a counter-clockwise primary optical transmission output terminal, a clockwise stand-by optical transmission line input terminal and a clockwise stand-by optical transmission output terminal, a counter-clockwise stand-by optical transmission line input terminal and a counter-clockwise stand-by optical transmission output terminal, a first wavelength division unit that performs a wavelength division operation on a first input optical signal which is a first wavelength multiplexed optical signal including respective wavelength components of $\lambda 1$ to $\lambda n$ wavelength (where n is an integer greater than or equal to 2 inputted from one of the clockwise primary optical transmission line input terminal, the counter-clockwise primary optical transmission line input terminal, the clockwise stand-by optical transmission line input terminal, and the counter-clockwise stand-by optical transmission line input terminal, into the respective wavelength components, and that outputs n first wavelength divided light signals comprising the respective wavelength components, a first wavelength multiplexing unit that wavelength-multiplexes the respective optical signals having the respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, and that outputs a second wavelength multiplexed optical signal, a second wavelength division unit that performs a wavelength division operation on a second input optical signal which is the first wavelength multiplexed optical signal including respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, into the respective wavelength components, and that outputs n second wavelength divided light signals comprising the respective wavelength components, a second wavelength multiplexing unit that wavelength-multiplexes the respective optical signals having the respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, and that outputs the second wavelength multiplexed optical signal, n insertion division units, each of the n insertion division units including a first wavelength divided light input section and a second wavelength divided light input section for receiving a respective one of the n first wavelength divided light signals and a respective one of the n second wavelength divided light signals having the wavelength components of the same wavelength $\lambda i$ (where i is an integer which satisfies an equation $1 \leq i \leq n$) out of the n first wavelength divided light signals and the n second wavelength divided light signals, and a first insertion optical signal input section and a second insertion optical signal input section for receiving respectively a first insertion input optical signal and a second insertion input optical signal having the same wavelength as the wavelength $\lambda i$ ($1 \leq i \leq n$), and outputting respectively a first insertion output optical signal and a second insertion output optical signal to the first wavelength multiplexing unit and the second wavelength multiplexing unit, a first stand-by path and a second stand-by path each having an input terminal and output terminal, a first optical path switching unit having first through fourth input ports and first through fourth output ports, the first optical path switching unit configured to switch a path of the first reception optical signal received on any one of the first through fourth input ports to any one of the first through fourth output ports, the first input port being connected to the output terminal of the first stand-by path, the second input port being connected to the clockwise primary optical transmission line input terminal, the third input port being connected to the second wavelength multiplexing unit, the fourth input port being connected to the clockwise stand-by optical transmission line input terminal, the first output port being connected to the clockwise stand-by optical transmission line output terminal, the second output port being connected to the first wavelength division unit, the third output port being connected to the clockwise primary optical transmission line output terminal, and the fourth output port being connected to the input terminal of the second stand-by path, a second optical path switching unit having first through fourth input ports and first through fourth output ports, the second optical path switching unit configured to switch a path of the second reception optical signal received on any one of the first through fourth input ports of the second optical path switching unit to any one of said first through fourth output ports of the second optical path switching unit, the first input port of the second optical path switching unit being connected to the clockwise stand-by optical transmission line input terminal, the second input port of the second optical path switching unit being connected to the first wavelength multiplexing unit, the third input port of the second optical path switching unit being connected to the clockwise primary optical transmission line input terminal, and the fourth input port of the second optical path switching unit being connected to the output terminal of the second stand-by path, the first output port of the second optical path switching unit being connected to the input terminal of the first stand-by path, the second output port of the second optical path switching unit being connected to the counter-clockwise primary optical transmission line output terminal, the third output port of the second optical path switching unit being connected to the second wavelength division unit, and the fourth output port of the second optical path switching unit being connected to the counter-clockwise stand-by optical transmission line output terminal.

17. The optical communication node as claimed in claim 16, wherein:

the first stand-by path is provided with a first junction optical amplifier provided between the input terminal and output terminal of the first stand-by path, for amplifying the input optical signal having n wavelength components of $\lambda 1$ to $\lambda n$ wavelength and outputting a first junction amplified optical signal, and the second stand-by path is provided with a second junction optical amplifier provided between the input terminal and output terminal of the second stand-by path, for amplifying the input optical signal having n wavelength components of $\lambda 1$ to $\lambda n$ wavelength and outputting a second junction amplified optical signal.

18. The optical communication node as claimed in claim 16, further comprising:

a first optical pre-amplifier provided between the first optical path switching unit and the first wavelength division unit, for optically amplifying the first wavelength multiplexed optical signal and outputting to the first wavelength division unit, and a second optical pre-amplifier provided between the second optical path switching unit and the second wavelength division unit, for optically amplifying the first wavelength multiplexed optical signal and outputting to the second wavelength division means.

19. The optical communication node as claimed in claim 16, wherein said each node further comprises:

a first booster optical amplifier provided between the first optical path switching the and the second wavelength multiplexing unit, for optically amplifying the second wavelength multiplexed optical signal and outputting to the first optical path switching unit, and a second booster optical amplifier provided between the second optical path switching unit and the first wavelength multiplexing unit, for optically amplifying the first wavelength multiplexed optical signal and outputting to the second optical path switching unit.

20. The optical communication node as claimed in claim 16, wherein each of the n insertion division unit comprises:

a photoelectric converter for converting respectively the n first wavelength divided light signals and the n second wavelength divided light signals to the first and second electrical signals, respectively, a first reception interface section and a second reception interface section for performing an overhead termination and division operation on the n first wavelength divided light signals and the n second wavelength divided light signals, and a first transmission interface section and a second transmission interface section for performing time-division multiplexing on the first and second electrical signals to perform overhead signal insertion, and for generating and outputting an optical signal having a same wavelength $\lambda i$ as the optical signal inputted to the first and second reception interface sections.

21. The optical communication node as claimed in claim 20, wherein each of the n insertion division units comprises:
   a low speed signal interface section for partially transmitting/receiving the data signal inputted/outputted through the first transmission interface section and the first reception interface section, and the second transmission interface section and the second reception interface section, and
   a cross connector section for connecting selectively two pairs of electrical data signals inputted from the first reception interface section and the second reception interface section and two pairs of electrical data signals outputted to the first transmission interface section and the second transmission interface section depending on an existence of a failure condition of the optical transmission line or the node, and for partially separating or inserting the data signal inputted/outputted through the first transmission interface section and the first reception interface section, and the second transmission interface section and the second reception interface section, and inputting to the low speed signal interface section.

22. The optical communication node as claimed in claim 16, wherein said each node further comprises:
   a first n×n optical switch connected to the first wavelength division unit, for connecting selectively respective optical signals having wavelengths of $\lambda 1$ to $\lambda n$ inputted from the first wavelength division means to the n insertion division units, and
   a second n×n optical switch connected to the second wavelength division unit, for connecting selectively respective optical signals having wavelengths of $\lambda 1$ to $\lambda n$ inputted from the second wavelength division unit to the n insertion division units.

23. The optical communication node as claimed in claim 16, wherein said each node comprises:
   p insertion division units including the n insertion division means, p being an integer greater than or equal to n,
   a first n×p optical switch provided subsequently to the first wavelength division units, for connecting selectively n optical signals having wavelengths of $\lambda 1$ to $\lambda n$ inputted from the wavelength division means to the p insertion division means,
   a second n×p optical switch provided subsequently to the first wavelength division units, for connecting selectively n optical signals having wavelengths of $\lambda 1$ to $\lambda n$ inputted from said wavelength division means to the p insertion division units,
   a first p×n optical switch provided preceding to the first wavelength multiplexing units, for connecting selectively p optical signals respectively inputted from said p insertion division units, to each input terminal of the first wavelength multiplexing unit, and
   a second p×n optical switch provided preceding to the second wavelength multiplexing units, for connecting selectively p optical signals respectively inputted from said p insertion division units, to each input terminal of the second wavelength multiplexing unit.

24. The optical communication node as claimed in claim 19, wherein each of the p insertion division units further comprises a wavelength selection unit that selects an optical signal wavelength out of the wavelengths of $\lambda 1$ to $\lambda n$.

25. The optical communication node as claimed in claim 16, wherein said each node further comprises a reception side 2×2 optical switch for selectively switching the first first wavelength divided light signals out of the n first wavelength divided light signals, and the first second wavelength divided light signals out of the n second wavelength divided light signals, and that outputs to the first wavelength divided light input section of the first insertion division unit.

26. The optical communication node as claimed in claim 25, wherein said each node further comprises a transmission side 2×2 optical switch for selectively switching the first first insertion optical signal out of the n first insertion optical signals and the first second insertion optical signal out of the n second insertion optical signals, and that outputs to the first wavelength multiplexing unit and said second wavelength multiplexing unit.

27. The optical communication node as claimed in claim 16, wherein the first wavelength division unit and the second wavelength division unit each includes an arrayed-waveguide grating.

28. The optical communication node as claimed in claim 16, wherein the first wavelength multiplexing unit and the second wavelength multiplexing unit each includes an arrayed-waveguide grating.

29. The optical communication node as claimed in claim 17, wherein first junction optical amplifier and second junction optical amplifier each includes an optical fiber amplifier.

30. The optical communication node as claimed in claim 17, wherein the first junction optical amplifier and the second junction optical amplifier each includes a semiconductor optical amplifier.

31. The optical communication node as claimed in claim 30, wherein the first optical pre-amplifier and the second optical pre-amplifier each includes an optical fiber amplifier.

32. The optical communication node as claimed in claim 18, wherein the first optical pre-amplifier and the second optical pre-amplifier each includes a semiconductor optical amplifier.

33. The optical communication node as claimed in claim 19, wherein the first booster optical amplifier and the second booster optical amplifier each includes an optical fiber amplifier.

34. The optical communication node as claimed in claim 19, wherein the first booster optical amplifier and the second booster optical amplifier each includes a semiconductor optical amplifier.

35. The optical communication node as claimed in claim 16, wherein, between said optical node and an adjacent optical node,
   the clockwise primary optical transmission line connects the clockwise primary optical transmission line input terminal of the optical node and the clockwise primary optical transmission line output terminal of the adjacent optical node, the counter-clockwise primary optical transmission line connects the counter-clockwise primary optical transmission line input terminal of the optical node and the counter-clockwise primary optical transmission line output terminal of the adjacent optical node, the clockwise stand-by optical transmission line connects the clockwise stand-by optical transmission line input terminal of the optical node and the clockwise stand-by optical transmission line output terminal of the adjacent optical node, and the counter-clockwise stand-by optical transmission line connects the counter-clockwise stand-by optical transmission line input terminal of the optical node and the counter-clockwise stand-by optical transmission line output terminal of the adjacent optical node, to thereby form a ring connection.

36. An optical communication node comprising:
a clockwise primary optical transmission line input terminal and a clockwise primary optical transmission output terminal,
a counter-clockwise primary optical transmission line input terminal and a counter-clockwise primary optical transmission output terminal,
a clockwise stand-by optical transmission line input terminal and a clockwise stand-by optical transmission output terminal,
a counter-clockwise stand-by optical transmission line input terminal and a counter-clockwise stand-by optical transmission output terminal,
a first wavelength division unit that performs a wavelength division operation on a first input optical signal which is a first wavelength multiplexed optical signal including respective wavelength components of $\lambda 1$ to $\lambda n$ wavelength inputted from one of the clockwise primary optical transmission line input terminal, the counter-clockwise primary optical transmission line input terminal, the clockwise stand-by optical transmission line input terminal, and the counter-clockwise stand-by optical transmission line input terminal, into the respective wavelength components, and that outputs n first wavelength divided light signals comprising the respective wavelength components, n being an integer greater than or equal to 2,
a first wavelength multiplexing unit that wavelength-multiplexes the respective optical signals having the respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, and that outputs a second wavelength multiplexed optical signal,
a second wavelength division unit that performs a wavelength division operation on a second input optical signal which is the first wavelength multiplexed optical signal including respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, into the respective wavelength components, and that outputs n second wavelength divided light signals comprising the respective wavelength components,
a second wavelength multiplexing unit that wavelength-multiplexes the respective optical signals having the respective wavelength components of $\lambda 1$ to $\lambda n$ wavelength inputted from the one of the clockwise primary optical transmission line input terminal, the counter-clockwise primary optical transmission line input terminal, the clockwise stand-by optical transmission line input terminal, and the counter-clockwise stand-by optical transmission line input terminal, and that outputs the second wavelength multiplexed optical signal,
at least one insertion division unit including a first reception unit for converting a first input optical signal to a first electrical signal, a second reception unit for converting a second input optical signal to a second electrical signal, a first transmission unit for converting the first electrical signal to a first output optical signal, and a second transmission unit for converting the second electrical signal to a second output optical signal,
a reception side 2×2 optical switch for selectively switching at least one first wavelength divided light signal out of the n first wavelength divided light signals and at least one second wavelength divided light signal having the wavelength component of wavelength $\lambda i$ corresponding to the wavelength $\lambda i$ of the first wavelength divided light signal, and outputting to the first reception unit and the second reception unit of the insertion division unit corresponding to the wavelength $\lambda i$ out of the insertion division unit,
a first stand-by path and a second stand-by path each having an input terminal and output terminal,
a first optical path switching unit having first through fourth input ports and first through fourth output ports, the first optical path switching unit configured to switch a path of the first reception optical signal received on any one of the first through fourth input ports to any one of the first through fourth output ports,
  the first input port being connected to the output terminal of the first stand-by path, the second input port being connected to the clockwise primary optical transmission line input terminal, the third input port being connected to the second wavelength multiplexing unit, the fourth input port being connected to the clockwise stand-by optical transmission line input terminal,
  the first output port being connected to the clockwise stand-by optical transmission line output terminal, the second output port being connected to the first wavelength division unit, the third output port being connected to the clockwise primary optical transmission line output terminal, and the fourth output port being connected to the input terminal of the second stand-by path,
a second optical path switching unit having first through fourth input ports and first through fourth output ports, the second optical path switching unit configured to switch a path of the second reception optical signal received on any one of the first through fourth input ports of the second optical path switching unit to any one of said first through fourth output sorts of the second optical path switching unit,
  the first input port of the second optical path switching unit being connected to the clockwise stand-by optical transmission line input terminal, the second input port of the second optical path switching unit being connected to the first wavelength multiplexing unit, the third input Dort of the second optical path switching unit being connected to the clockwise primary optical transmission line input terminal, and the fourth input port of the second optical path switching unit being connected to the output terminal of the second stand-by path,
  the first output Dort of the second optical path switching unit being connected to the input terminal of the first stand-by path, the second output port of the second optical path switching unit being connected to the counter-clockwise primary optical transmission line output terminal, the third output port of the second optical path switching unit being connected to the second wavelength division unit, and the fourth output port of the second optical path switching unit being connected to the counter-clockwise stand-by optical transmission line output terminal.

37. The optical communication node as claimed in claim 36, wherein said each node further comprises a transmission side 2×2 optical switch for selectively switching the i-th first insertion optical signal out of the n first insertion optical signals and the i-th second insertion optical signal out of the n second insertion optical signals, and outputting to the first wavelength multiplexing unit and the second wavelength multiplexing unit.

38. The optical communication node as claimed in claim 37, wherein:
   the first stand-by path is provided with a first junction optical amplifier provided between the input terminal and output terminal of the first stand-by path, for amplifying the input optical signal having n wavelength components of $\lambda 1$ to $\lambda n$ wavelength and outputting a first junction amplified optical signal, and
   the second stand-by path is provided with a second junction optical amplifier provided between the input terminal and output terminal of the second stand-by path, for amplifying the input optical signal having n wavelength components of $\lambda 1$ to $\lambda n$ wavelength and outputting a second junction amplified optical signal.

39. The optical communication node as claimed in claim 36, further comprising:
   a first optical pre-amplifier provided between the first optical path switching unit and the first wavelength division unit, for optically amplifying the wavelength multiplexed optical signal and outputting to the first wavelength division unit, and
   a second optical pre-amplifier provided between the second optical path switching unit and the second wavelength division unit, for optically amplifying the second wavelength multiplexed optical signal and outputting to the second wavelength division unit.

40. The optical communication node as claimed in claim 36, wherein said each node further comprises:
   a first booster optical amplifier provided between the first optical path switching unit and the second wavelength multiplexing unit, for optically amplifying the second wavelength multiplexed optical signal and outputting to the first optical path switching unit, and
   a second booster optical amplifier provided between the second optical path switching unit and the first wavelength multiplexing unit, for optically amplifying the first wavelength multiplexed optical signal and outputting to the second optical path switching unit.

41. The optical communication node as claimed in claim 36, wherein each of the n insertion division units comprises:
   a photoelectric converter for converting respectively the n first wavelength divided light signals and the n second wavelength divided light signals to the first and second electrical signals, respectively,
   a first reception interface section and a second reception interface section for performing overhead termination and division operation on the n first wavelength divided light signals and the n second wavelength divided light signals, and
   a first transmission interface section and a second transmission interface section for performing time-division multiplexing on the first and second electrical signals to perform overhead signal insertion, and for generating and outputting an optical signal having a same wavelength $\lambda i$ as the optical signal inputted to first and second reception interface sections.

42. The optical communication node as claimed in claim 41, wherein each of the n insertion division units comprises:
   a low speed signal interface section for partially transmitting/receiving the data signal inputted/outputted through the first transmission interface section and the first reception interface section, and the second transmission interface section and the second reception interface section, and
   a cross connector section for connecting selectively two pairs of electrical data signals inputted from the first reception interface section and the second reception interface section and two pairs of electrical data signals outputted to the first transmission interface section and the second transmission interface section depending on an existence of a failure condition of the optical transmission line or the node, and for partially separating or inserting the data signal inputted/outputted through the first transmission interface section and the first reception interface section, and the second transmission interface section and the second reception interface section, and inputting to the low speed signal interface section.

43. The optical communication node as claimed in claim 36, wherein the first wavelength division unit and the second wavelength division unit each includes an arrayed-waveguide grating.

44. The optical communication node as claimed in claim 36, wherein the first wavelength multiplexing unit and the second wavelength multiplexing unit each includes an arrayed-waveguide grating.

45. The optical communication node as claimed in claim 38, wherein the first junction optical amplifier and the second junction optical amplifier each includes an optical fiber amplifier.

46. The optical communication node as claimed in claim 38, wherein the first junction optical amplifier and the second junction optical amplifier each includes a semiconductor optical amplifier.

47. The optical communication node as claimed in claim 39, wherein the first optical pre-amplifier and the second optical pre-amplifier each includes an optical fiber amplifier.

48. The optical communication node as claimed in claim 39, wherein the first optical pre-amplifier and the second optical pre-amplifier each includes a semiconductor optical amplifier.

49. The optical communication node as claimed in claim 40, wherein the first booster optical amplifier and the second booster optical amplifier each includes an optical fiber amplifier.

50. The optical communication node as claimed in claim 40, wherein the first booster optical amplifier and the second booster optical amplifier each includes a semiconductor optical amplifier.

51. The optical communication node as claimed in claim 50, wherein m nodes are provided, m being an integer greater than or equal to 2, and wherein, between said optical node and an adjacent optical node,
   the clockwise primary optical transmission line connects the clockwise primary optical transmission line input terminal of the optical node and the clockwise primary optical transmission line output terminal of the adjacent optical node, the counter-clockwise primary optical transmission line connects the counter-clockwise primary optical transmission line input terminal of the optical node and the counter-clockwise primary optical transmission line output terminal of the adjacent optical node, the clockwise stand-by optical transmission line connects the clockwise stand-by optical transmission line input terminal of the optical node and the clockwise stand-by optical transmission line output terminal of the adjacent optical node, and the counter-clockwise stand-by optical transmission line connects the counter-clockwise stand-by optical transmission line input terminal of the optical node and the counter-clockwise stand-by optical transmission line output terminal of the adjacent optical node, to thereby form a ring connection.

52. An optical communication node comprising:

a clockwise optical transmission line input terminal and output terminal, a counter-clockwise optical transmission line input terminal and output terminal, a first wavelength division unit that performs a wavelength division operation on a first input optical signal which is a first wavelength multiplexed optical signal including respective wavelength components of $\lambda 1$ to $\lambda n$ wavelength inputted from one of the clockwise optical transmission line input terminal and the counter-clockwise optical transmission line input terminal, into the respective wavelength components, and that outputs n first wavelength divided light signals comprising the respective wavelength components, a first wavelength multiplexing unit that wavelength-multiplexes the respective optical signals having the respective wavelength components of $\lambda 1$ to $\lambda n$ wavelength inputted from the one of the clockwise optical transmission line input terminal and the counter-clockwise optical transmission line input terminal, and that outputs a second wavelength multiplexed optical signal, a second wavelength division unit that performs a wavelength division operation on a second input optical signal which is the first wavelength multiplexed optical signal including respective wavelength components of $\lambda n+1$ to $\lambda n+n$ wavelength inputted from the one of the clockwise optical transmission line input terminal and the counter-clockwise optical transmission line input terminal, into the respective wavelength components, and that outputs n second wavelength divided light signals comprising the respective wavelength components, a second wavelength multiplexing unit that wavelength-multiplexes the respective optical signals having the respective wavelength components of $\lambda n+1$ to $\lambda n+n$ wavelength inputted from the one of the clockwise optical transmission line input terminal and the counter-clockwise optical transmission line input terminal, and that outputs the second wavelength multiplexed optical signal, n insertion division units, each of the n insertion division units including a first wavelength divided light input section and a second wavelength divided light input section for receiving a respective one of the first wavelength divided light signals having the wavelength component of $\lambda i$ wavelength and a respective one of the second wavelength divided light signals, and a first insertion optical signal input section and a second insertion optical signal input section for receiving a first insertion input optical signal having the same wavelength as said wavelength $\lambda i$ and said second insertion optical signal having the wavelength of $\lambda i+n$ wavelength corresponding to the first insertion optical signal, and outputting respectively a first insertion output optical signal and a second insertion output optical signal to the first wavelength multiplexing unit and the second wavelength multiplexing unit, a first optical turnout section provided between the counter-clockwise optical transmission line and the first wavelength division unit, for branching partially the first input optical signal outputted from the counter-clockwise optical transmission line to output a first turnout input optical signal, a second optical turnout section provided between the clockwise optical transmission line and the second wavelength division unit, for branching partially the second input optical signal outputted from the clockwise optical transmission line to output a second turnout input optical signal, a first 2×1 optical switch for selecting the first input optical signal and the second turnout input optical signal and outputting to the first wavelength division unit, a second 2×1 optical switch for selecting the second input optical signal and the first turnout input optical signal and outputting to the second wavelength division unit, a first optical coupling section for coupling the first multiplexing optical signal and the second turnout multiplexing optical signal, a second optical coupling section for coupling the second multiplexing optical signal and the first turnout multiplexing optical signal, a first 1×2 optical path selection unit provided between the first wavelength multiplexing unit and the first optical coupling section, for selecting and outputting the first multiplexing optical signal to the first optical coupling section and the second optical coupling section, and a second 1×2 optical path selection unit provided between the second wavelength multiplexing unit and the second optical coupling section, for selecting and outputting the second multiplexing optical signal to the second optical coupling section and the first optical coupling section.

53. The optical communication node as claimed in claim 52, wherein each node further comprises:

a first optical pre-amplifier provided between the counter-clockwise optical transmission line and the first wavelength division unit, for optically amplifying the inputted first input optical signal and outputting to the first wavelength division unit, and a second optical pre-amplifier provided between the clockwise optical transmission line and the second wavelength division unit, for optically amplifying the inputted second input optical signal and outputting to the second wavelength division unit.

54. The optical communication node as claimed in claim 52, wherein said each node further comprises:

a first booster optical amplifier provided between the first wavelength multiplexing unit and the counter-clockwise optical transmission lines for optically amplifying the first wavelength multiplexed optical signal and outputting to the counter-clockwise optical transmission line, and a second booster optical amplifier provided between the second wavelength multiplexing unit and the clockwise optical transmission line, for optically amplifying the second wavelength multiplexed optical signal and outputting to the clockwise optical transmission line.

55. The optical communication node as claimed in claim 52, wherein each of the n insertion division unit comprises:
   a photoelectric converter for converting respectively the n first wavelength divided light signals and the n second wavelength divided light signals to the first and second electrical signals, respectively,
   a first reception interface section and a second reception interface section for performing an overhead termination and division operation on the n first wavelength divided light signals and the n second wavelength divided light signals, and
   a first transmission interface section and a second transmission interface section for performing time-division multiplexing on the first and second electrical signals to perform overhead signal insertion, and for generating and outputting an optical signal having a same wavelength $\lambda i$ as the optical signal inputted to the first and second reception interface sections.

56. The optical communication node as claimed in claim 55, wherein each of the n insertion division units comprises:
   a low speed signal interface section for partially transmitting/receiving the data signal inputted/outputted through the first transmission interface section and the first reception interface section, and the second transmission interface section and the second reception interface section, and
   a cross connector section for connecting selectively two pairs of electrical data signals inputted from the first reception interface section and the second reception interface section and two pairs of electrical data signals outputted to the first transmission interface section and the second transmission interface section depending on an existence of a failure condition of the optical transmission line or the node, and for partially separating or inserting the data signal inputted/outputted through the first transmission interface section and the first reception interface section, and the second transmission interface section and the second reception interface section, and inputting to the low speed signal interface section.

57. The optical communication node as claimed in claim 52, wherein said each node further comprises:
   a first n×n optical switch provided subsequently to the first wavelength division unit, for connecting selectively respective optical signals having wavelengths of $\lambda 1$ to $\lambda n$ inputted from the first wavelength division unit to said n insertion division unit, and
   a second n×n optical switch provided subsequently to said second wavelength division unit, for connecting selectively respective optical signals having wavelengths of $\lambda 1$ to $\lambda n$ inputted from the second wavelength division unit to the n insertion division unit.

58. The optical communication node as claimed in claim 52, wherein said each node comprises:
   p insertion division units including the n insertion division means, p being an integer greater than or equal to n,
   a first n×p optical switch provided subsequently to the first wavelength division unit, for connecting selectively n optical signals having wavelengths of $\lambda 1$ to $\lambda n$ inputted from the wavelength division unit to the p insertion division units,
   a second n×p optical switch provided subsequently to said first wavelength division units, for connecting selectively n optical signals having wavelengths of $\lambda 1$ to $\lambda n$ inputted from the wavelength division unit to the p insertion division units,
   a first p×n optical switch provided preceding to the first wavelength multiplexing unit, for connecting selectively p optical signals respectively inputted from said p insertion division units to each input terminal of the first wavelength multiplexing unit, and
   a second p×n optical switch provided preceding to the second wavelength multiplexing unit, for connecting selectively p optical signals respectively inputted from said p insertion division units to each input terminal of the second wavelength multiplexing unit.

59. The optical communication node as claimed in claim 52, wherein each of the p insertion division units comprises a wavelength selection unit for selecting the optical signal wavelength out of the wavelengths of $\lambda 1$ to $\lambda n$.

60. The optical communication node as claimed in claim 52, wherein said each node further comprises a reception side 2×2 optical switch for selectively switching the first first wavelength divided light signals out of the n first wavelength divided light signals, and the first second wavelength divided light signals out of the n second wavelength divided light signals, and that outputs to the first wavelength divided light input section of the first insertion division unit.

61. The optical communication node as claimed in claim 60, wherein said each node further comprises a transmission side 2×2 optical switch for selectively switching the first first insertion optical signal out of the n first insertion optical signals and the first second insertion optical signal out of said n second insertion optical signals, and that outputs to the first wavelength multiplexing unit and the second wavelength multiplexing unit.

62. The optical communication node as claimed in claim 52, wherein the first wavelength division unit and the second wavelength division unit each includes an arrayed-waveguide grating.

63. The optical communication node as claimed in claim 52, wherein the first wavelength multiplexing unit and the second wavelength multiplexing unit each includes an arrayed-waveguide grating.

64. The optical communication node as claimed in claim 53, wherein the first optical pre-amplifier and the second optical pre-amplifier each includes an optical fiber amplifier.

65. The optical communication node as claimed in claim 53, wherein the first optical pre-amplifier and the second optical pre-amplifier each includes a semiconductor optical amplifier.

66. The optical communication node as claimed in claim 54, wherein the first booster optical amplifier and the second booster optical amplifier each includes an optical fiber amplifier.

67. The optical communication node as claimed in claim 54, wherein the first booster optical amplifier and the second booster optical amplifier each includes a semiconductor optical amplifier.

68. The optical communication node as claimed in claim 52, wherein a ring structure is provided with m of the optical communication nodes, and wherein,
   between an optical node and an adjacent optical node, the clockwise optical transmission line connects the clockwise optical transmission line input terminal of the optical node and the clockwise optical transmission line output terminal of the adjacent optical node, the counter-clockwise optical transmission line connects the counter-clockwise optical transmission line input terminal of the optical node and the counter-clockwise operation optical transmission line output terminal of the adjacent optical node, to thereby form a ring connection.

69. An optical communication node comprising:

a clockwise optical transmission line input terminal and a clockwise optical transmission line output terminal, a counter-clockwise optical transmission line input terminal and a counter-clockwise optical transmission output terminal, a first wavelength division unit that performs a wavelength division operation on a first input optical signal which is a first wavelength multiplexed optical signal including respective wavelength components of $\lambda 1$ to $\lambda n$ wavelength inputted from one of the clockwise optical transmission line input terminal and the counter-clockwise optical transmission line input terminal, into the respective wavelength components, and that outputs n first wavelength divided light signals comprising the respective wavelength components, a first wavelength multiplexing unit that wavelength-multiplexes the respective optical signals having the respective wavelength components of $\lambda 1$ to $\lambda n$ wavelength inputted from the one of the clockwise optical transmission line input terminal and the counter-clockwise optical transmission line input terminal, and that outputs a second wavelength multiplexed optical signal, a second wavelength division unit that performs a wavelength division operation on a second input optical signal which is the first wavelength multiplexed optical signal including respective wavelength components of $\lambda n+1$ to $\lambda n+n$ wavelength inputted from the one of the clockwise optical transmission line input terminal and the counter-clockwise optical transmission line input terminal, into the respective wavelength components, and that outputs n second wavelength divided light signals comprising the respective wavelength components, a second wavelength multiplexing unit that wavelength-multiplexes the respective optical signals having the respective wavelength components of $\lambda n+1$ to $\lambda n+n$ wavelength inputted from the one of the clockwise optical transmission line input terminal and the counter-clockwise optical transmission line input terminal, and that outputs the second wavelength multiplexed optical signal, at least one insertion division unit including a first reception unit for converting a first input optical signal to a first electrical signal, a second reception unit for converting a second input optical signal to a second electrical signal, a first transmission unit for converting the first electrical signal to a first output optical signal, and a second transmission unit for converting the second electrical signal to a second output optical signal, a reception side 2×2 optical switch for selectively switching at least one first wavelength divided light signal out of the n first wavelength divided light signals and at least one second wavelength divided light signal having the wavelength component of wavelength $\lambda i$ corresponding to the wavelength $\lambda i$ of the first wavelength divided light signal, and outputting to the first reception unit and the second reception unit of the insertion division unit corresponding to the wavelength $\lambda i$ out of the insertion division unit, a transmission side 2×2 optical switch for selectively switching a first insertion optical signal corresponding to said one first wavelength divided light having the wavelength of $\lambda i$ out of the n first insertion optical signals and a second insertion optical signal having the wavelength component of $\lambda i+n$ wavelength out of the n second insertion optical signals, and that outputs to the first wavelength multiplexing unit and the second wavelength multiplexing unit, a first optical turnout section provided between the counter-clockwise optical transmission line and the first wavelength division unit, for branching partially the first input optical signal outputted from the counter-clockwise optical transmission line to output a first turnout input optical signal, a second optical turnout section provided between the clockwise optical transmission line and the second wavelength division unit, for branching partially the second input optical signal outputted from the clockwise optical transmission line to output a second turnout input optical signal, a first 2×1 optical switch for selecting the first input optical signal and the second turnout input optical signal and outputting to the first wavelength division unit, a second 2×1 optical switch for selecting the second input optical signal and the first turnout input optical signal and outputting to the second wavelength division unit, a first optical coupling section for coupling the first multiplexing optical signal and the second turnout multiplexing optical signal, a second optical coupling section for coupling the second multiplexing optical signal and the first turnout multiplexing optical signal, a first 1×2 optical path selection unit provided between the first wavelength multiplexing unit and the first optical coupling section, for selecting and outputting the first multiplexing optical signal to the first optical coupling section and the second optical coupling section, and a second 1×2 optical path selection unit provided between the second wavelength multiplexing unit and the second optical coupling section, for selecting and outputting the second multiplexing optical signal to the second optical coupling section and the first optical coupling section.

70. The optical communication node as claimed in claim 69, wherein each node further comprises:

a first optical pre-amplifier provided between the counter-clockwise optical transmission line and the first wavelength division unit, for optically amplifying the inputted first input optical signal and outputting to the first wavelength division unit, and a second optical pre-amplifier provided between the clockwise optical transmission line and the second wavelength division unit, for optically amplifying the inputted second input optical signal and outputting to the second wavelength division unit.

71. The optical communication node as claimed in claim 69, wherein said each node further comprises:

a first booster optical amplifier provided between the first wavelength multiplexing unit and the counter-clockwise optical transmission line, for optically amplifying the first wavelength multiplexed optical signal and outputting to the counter-clockwise optical transmission line, and a second booster optical amplifier provided between the second wavelength multiplexing unit and the clockwise optical transmission lines for optically amplifying the second wavelength multiplexed optical signal and outputting to the clockwise optical transmission line.

72. The optical communication node as claimed in claim 69, wherein each of the n insertion division unit comprises:
   a photoelectric converter for converting respectively the n first wavelength divided light signals and the n second wavelength divided light signals to the first and second electrical signals, respectively,
   a first reception interface section and a second reception interface section for performing an overhead termination and division operation on the n first wavelength divided light signals and the n second wavelength divided light signals, and
   a first transmission interface section and a second transmission interface section for performing time-division multiplexing on the first and second electrical signals to perform overhead signal insertion, and for generating and outputting an optical signal having a same wavelength $\lambda i$ as the optical signal inputted to the first and second reception interface sections.

73. The optical communication node as claimed in claim 72, wherein each of the n insertion division units comprises:
   a low speed signal interface section for partially transmitting/receiving the data signal inputted/outputted through the first transmission interface section and the first reception interface section, and the second transmission interface section and the second reception interface section, and
   a cross connector section for connecting selectively two pairs of electrical data signals inputted from the first reception interface section and the second reception interface section and two pairs of electrical data signals outputted to the first transmission interface section and the second transmission interface section depending on an existence of a failure condition of the optical transmission line or the node, and for partially separating or inserting the data signal inputted/outputted through the first transmission interface section and the first reception interface section, and the second transmission interface section and the second reception interface section, and inputting to the low speed signal interface section.

74. The optical communication node as claimed in claim 69, wherein the first wavelength division unit and the second wavelength division unit each includes an arrayed-waveguide grating.

75. The optical communication node as claimed in claim 69, wherein the first wavelength multiplexing unit and the second wavelength multiplexing unit each includes an arrayed-waveguide grating.

76. The optical communication node as claimed in claim 70, wherein the first optical pre-amplifier and the second optical pre-amplifier each includes an optical fiber amplifier.

77. The optical communication node as claimed in claim 70, wherein the first optical pre-amplifier and the second optical pre-amplifier each includes a semiconductor optical amplifier.

78. The optical communication node as claimed in claim 71, wherein the first booster optical amplifier and the second booster optical amplifier each includes an optical fiber amplifier.

79. The optical communication node as claimed in claim 71, wherein the first booster optical amplifier and the second booster optical amplifier each includes a semiconductor optical amplifier.

80. The optical communication node as claimed in claim 69, wherein a ring structure is provided with m of the optical communication nodes, m being an integer greater than or equal to 2, and wherein,
   between an optical node and an adjacent optical node, the clockwise optical transmission line connects the clockwise optical transmission line input terminal of the optical node and the clockwise optical transmission line output terminal of the adjacent optical node, the counter-clockwise optical transmission line connects the counter-clockwise optical transmission line input terminal of the optical node and the counter-clockwise operation optical transmission line output terminal of the adjacent optical node, to thereby form a ring connection.

81. A wavelength division multiplexing system for a plurality of nodes connected in a ring configuration, comprising:
   a first clockwise communication path provided for data transfer between the plurality of nodes;
   a first counter-clockwise communication path provided for data transfer between the plurality of nodes, the first clockwise and counter-clockwise communication paths operating together as a primary bi-directional communication path;
   a second clockwise communication path provided for data transfer between the plurality of nodes;
   a second counter-clockwise communication path provided for data transfer between the plurality of nodes, the second clockwise and counter-clockwise communication paths operating together as a stand-by bi-directional communication path;
   wherein each of the plurality of nodes includes,
   a first switch providing connectivity between said each of the plurality of nodes and a first adjacent node; and
   a second switch providing connectivity between said each of the plurality of nodes and a second adjacent node,
   wherein the first and second switches are operable to provide connectivity between the first clockwise communication path and a selected one of: a) the first clockwise communication path, b) the second clockwise communication path, and c) the second counter-clockwise communication path, when at least one of said plurality of nodes fails.

82. A wavelength division multiplexing method for a system having a plurality of nodes connected in a ring configuration, the system comprising:
   a first clockwise communication path provided for data transfer between the plurality of nodes;
   a first counter-clockwise communication path provided for data transfer between the plurality of nodes, the first clockwise and counter-clockwise communication paths operating together as a primary bi-directional communication path;
   a second clockwise communication path provided for data transfer between the plurality of nodes;
   a second counter-clockwise communication path provided for data transfer between the plurality of nodes, the second clockwise and counter-clockwise communication paths operating together as a stand-by bi-directional communication path,
   the method comprising the steps of:
   a) providing connectivity between said each of the plurality of nodes and a first adjacent node, the connectivity being provided by a first switch located at said each of the plurality of nodes;

b) providing connectivity between said each of the plurality of nodes and a second adjacent node, the connectivity being provided by a second switch located at said each of the plurality of nodes;

c) detecting a failure in at least one of said nodes; and d) providing connectivity between any particular two of said first clockwise, first counter-clockwise, second clockwise, and second counter-clockwise communication paths via the first and second switches when the failure is detected in step c).

83. A wavelength division multiplexing system for a plurality of nodes connected in a ring configuration, comprising:

a primary bi-directional communication path provided for data transfer between the plurality of nodes;

a stand-by bi-directional communication path provided for data transfer between the plurality of nodes;

wherein each of the plurality of nodes includes, a first switch providing connectivity between said each of the plurality of nodes and a first adjacent node; and a second switch providing connectivity between said each of the plurality of nodes and a second adjacent node, wherein, when a portion of the primary bi-directional communication path that is located between two of said plurality of nodes is in an inoperable state, said two of said plurality of nodes detect the inoperable state, and reconfigure the system to provide communications between a source node and a destination node using one of a first direction and a second direction of said stand-by bi-directional path between said two of said plurality of nodes, the one of the first direction and the second direction being selected based a location of the portion with respect to said two of said plurality of nodes.

84. A wavelength division multiplexing method for a system having a plurality of nodes connected in a ring configuration, the system comprising:

a primary bi-directional communication path provided for data transfer between the plurality of nodes;

a stand-by bi-directional communication path provided for data transfer between the plurality of nodes;

the method comprising the steps of:

a) providing connectivity between said each of the plurality of nodes and a first adjacent node, the connectivity being provided by a first switch located at said each of the plurality of nodes;

b) providing connectivity between said each of the plurality of nodes and a second adjacent node, the connectivity being provided by a second switch located at said each of the plurality of nodes;

c) detecting an inoperable state between a portion of the primary bi-directional communication path that is located between two of the plurality of nodes; and d) reconfiguring the system to provide communications between a source node and a destination node using one of a first direction and a second direction of the stand-by bi-directional path between said two of the plurality of nodes, the one of the first direction and the second direction being selected based a location of the portion with respect to said two of said plurality of nodes.

85. A wavelength division multiplexing system for a plurality of nodes connected in a ring configuration, comprising:

a primary bi-directional communication path provided for data transfer between the plurality of nodes, the primary bi-directional communication path providing for transfer of WDM signals having wavelengths between $\lambda 1$ and $\lambda n$ inclusive in a normal mode, and providing for transfer of WDM signals having wavelengths between $\lambda n+1$ and $\lambda n+n$ in a failure mode, the failure mode corresponding to a failure in either one of said nodes or one of said communication paths;

a stand-by bi-directional communication path provided for data transfer between the plurality of nodes, the stand-by bi-directional communication path providing for transfer of WDM signals having wavelengths between $\lambda 1$ and $\lambda n$ inclusive in the normal mode, and providing for transfer of WDM signals having wavelengths between $\lambda n+1$ and $\lambda n+n$ in the failure mode; and a control unit provided in each of said plurality of nodes and configured to switch WDM signals, as required, to a first wavelength range $\lambda 1$ to $\lambda n$ and a second wavelength range $\lambda n+1$ and $\lambda n+n$, and to switch the WDM signals to one of the primary communication path and the stand-by communication path, based on which of said nodes is a source node sending the WDM signals, which of said nodes is a destination node to receive the WDM signals, and which of said nodes or which portion of said communication paths is in the failure mode.

86. The wavelength division multiplexing method as claimed in claim 85, wherein, between two adjacent ones of the plurality of nodes, the WDM signals are switched to one of: a) the primary communication path, b) a first direction of the stand-by bi-directional communication path, and c) a second direction of the stand-by bi-directional path, and wherein the switching is performed based on whether the failure is due to a node or due to a communications path, as well as a location of the failure with respect to the two adjacent ones of the plurality of nodes.

* * * * *